US010826786B2

(12) United States Patent
Eckart et al.

(10) Patent No.: US 10,826,786 B2
(45) Date of Patent: Nov. 3, 2020

(54) FAST MULTI-SCALE POINT CLOUD REGISTRATION WITH A HIERARCHICAL GAUSSIAN MIXTURE

(71) Applicant: NVIDIA Corporation, Santa Clara, CA (US)

(72) Inventors: Benjamin David Eckart, Pittsburgh, PA (US); Kihwan Kim, Campbell, CA (US); Jan Kautz, Lexington, MA (US)

(73) Assignee: NVIDIA Corporation, Santa Clara, CA (US)

(*) Notice: Subject to any disclaimer, the term of this patent is extended or adjusted under 35 U.S.C. 154(b) by 65 days.

(21) Appl. No.: 16/351,312

(22) Filed: Mar. 12, 2019

(65) Prior Publication Data
US 2019/0319851 A1    Oct. 17, 2019

Related U.S. Application Data

(60) Provisional application No. 62/656,286, filed on Apr. 11, 2018.

(51) Int. Cl.
*H04L 12/24* (2006.01)
*G06F 17/18* (2006.01)
(Continued)

(52) U.S. Cl.
CPC ........ *H04L 41/142* (2013.01); *G06F 16/2246* (2019.01); *H04L 67/10* (2013.01)

(58) Field of Classification Search
None
See application file for complete search history.

(56) References Cited

U.S. PATENT DOCUMENTS 9,767,604 B2 * 9/2017 Pham .................... G06T 17/005
2016/0358371 A1 * 12/2016 Meeussen .............. G06T 15/10
(Continued)

FOREIGN PATENT DOCUMENTS

CN       104966287 A  * 10/2015
EP         3629289 A1  *  4/2020

OTHER PUBLICATIONS

S. Li, J. Wang, Z. Liang and L. Su, "Tree point clouds registration using an improved ICP algorithm based on kd-tree," 2016 IEEE International Geoscience and Remote Sensing Symposium (IGARSS), Beijing, 2016, pp. 4545-4548, doi: 10.1109/IGARSS.2016.7730186. (Year: 2016).*

(Continued)

*Primary Examiner* — Natisha D Cox
(74) *Attorney, Agent, or Firm* — Leydig, Voit & Mayer, Ltd.

(57) ABSTRACT

Point cloud registration sits at the core of many important and challenging 3D perception problems including autonomous navigation, object/scene recognition, and augmented reality (AR). A new registration algorithm is presented that achieves speed and accuracy by registering a point cloud to a representation of a reference point cloud. A target point cloud is registered to the reference point cloud by iterating through a number of cycles of an EM algorithm where, during an Expectation step, each point in the target point cloud is associated with a node of a hierarchical tree data structure and, during a Maximization step, an estimated transformation is determined based on the association of the points with corresponding nodes of the hierarchical tree data structure. The estimated transformation is determined by solving a minimization problem associated with a sum, over a number of mixture components, over terms related to a Mahalanobis distance.

22 Claims, 15 Drawing Sheets

(51) Int. Cl.
G06F 16/22 (2019.01)
H04L 29/08 (2006.01)

(56) References Cited

U.S. PATENT DOCUMENTS

2017/0221258 A1* 8/2017 Marder-Eppstein ........................
G06T 17/005
2017/0249401 A1* 8/2017 Eckart ..................... G06F 17/18

OTHER PUBLICATIONS

M. Vlaminck, H. Luong and W. Philips, "Multi-resolution ICP for the efficient registration of point clouds based on octrees," 2017 Fifteenth IAPR International Conference on Machine Vision Applications (MVA), Nagoya, 2017, pp. 334-337, doi: 10.23919/MVA.2017.7986869. (Year: 2017).*
W. Guan, W. Li and Y. Ren, "Point cloud registration based on improved ICP algorithm," 2018 Chinese Control and Decision Conference (CCDC), Shenyang, 2018, pp. 1461-1465, doi: 10.1109/CCDC.2018.8407357. (Year: 2018).*
Drost, B., et al., "Efficient and robust 3d object recognition," CVPR (2010) IEEE Conference.
Nuchter, A., "6d-3d mapping outdoor environments," Research articles, J. Field Robot, 24(8-9) (2007) 699-722.
Newcombe, R.A., et al., Kinectfusion: Real-time dense surface mapping and tracking, IEEE ISMAR, (2011) 127-136.
Park, I.K., et al., "Fast and automatic object pose estimation for range images on the gpu," Machine Vision and Applications 21 (Aug. 2010) 749-766.
Tam, G.K., etal., Registration of 3d point clouds and meshes: A survey from rigid to non-rigid, IEEE Transactions on Visualization and Computer Graphics 19(7) (2013) 1199-1217.
Mehta, S.U., et al., "Filtering Environment Illumination for Interactive Physically-Based Rendering in Mixed Reality," Eurographics Symposium on Rendering (2015).
Hahnel, D., et al., "An extension of the icp algorithm for modeling nonrigid objects with mobile robots," Proceedings of the 18th International Joint Conference on Artificial Intelligence, IJCAI (2003) 915-920.
Levinson, J., et al., "Towards fully autonomous driving: Systems and algorithms," Intelligent Vehicles Symposium, IEEE (2011) 163-168.
Besl, P., "A method for registration of 3-D shapes," IEEE Transactions on Pattern Analysis and Machine Intelligence 14(2) (1992) 239-256.
Chen, Y., et al., "Object modelling by registration of multiple range images," Image and Vision Computing 10(3) (1992) 145-155.
Rusinkiewicz, S., et al., "Efficient variants of the ICP algorithm," International Conference on 3D Digital Imaging and Modeling (2001) 145-152.
Gold, S., et al., "New algorithms for 2d and 3d point matching: pose estimation and correspondence," Pattern Recognition 31(8) (1998) 1019-1031.
Tamaki, T., et al., "Softassign and EM-CIP on GPU," IEEE International Conference on Networking and Computing (2010) 179-183.
Myronenko, A., et al, "Point set registration: Coherent point drift," IEEE Transactions on Pattern Analysis and Machine Intelligence, 32(12) (2010) 2262-2275.
Dempster, A., "Maximum likelihood from incomplete data via the em algorithm," Journal of the Royal Statistical Society (1977) 1-38.
Segai, A., et al., "Generalized ICP," Robotics: Science and Systems 2(4) (2009).
Granger, S., et al., "Multi-scale EM-ICP: A fast and robust approach for surface registration," ECCV (2002) 69-73.

Chui, H., et al., "A feature registration framework using mixture models," IEEE Workshop on Mathematical Methods in Biomedical Image Analysis (2000) 190-197.
Evangelidis, G.D., "A generative model for the joint registration of multiple point sets," ECCV (2014) 109-122.
Horaud, R., et al., "Rigid and articulated point registration with expectation conditional maximization," IEEE Trans. on Pattern Analysis and Machine Intelligence 33(3) (2011) 587-602.
Fitzgibbon, A.W., "Robust registration of 2d and 3d point sets," Image and Vision Computing 21(13) (2003) 1145-1153.
Tsin, Y., et al., "A correlation-based approach to robust point set registration," ECCV (2004) 558-569.
Chetverikov, D., et al., "Robust Euclidean alignment of 3d point sets: the trimmed iterative closest point algorithm," Image and Vision Computing 23(3) (2005) 299-309.
Phillips, J.M., et al., "Outlier robust icp for minimizing fractional rmsd," In 3D Dignital Imaging and Modeling (2007), Sixth International Conference on IEEE (2007) 427-434.
Jian, B., "Robust point set registration using Gaussian mixture models," Pattern Analysis and Machine Intelligence, IEEE Transactions on 33(8) (2011) 1633-1645.
Stoyanov, T.D., et al., "Fast and accurate scan registration through minimization of the distance between compact 3D NDT representations," International Journal of Robotics Research (2012).
Eckart, B., et al., "REM-seg: A robust EM algorithm for parallel segmentation and registration of point clouds," IEEE Conf. on Intelligent Robotics and Systms (2013) 4355-4362.
Eckart, B., et al., "Mlmd: Maximum likelihood mixture decoupling for fast and accurate point cloud registration," IEEE International Conference on 3D Vision (2015).
Campbell, D., et al., "An adaptive data representation for robust point-set registration and merging," Proceedings of the IEE International Conference on Computer Vision (2015) 4292-4300.
Evangelidis, G.D., "Joint alignment of multiple point sets with batch and incremental expectation-maximization," IEEE Transactions on Pattern Analysis and Machine Intelligence (2017).
Jian, B., et al., "A robust algorithm for point set registration using mixture of Gaussians," IEEE International Conference on Computer Vision (2015) 1246-1251.
Eckart, B., "Accelerated generative models for 3d point cloud data," CVPR, IEEE (2016).
Myronenko, A., et al., "Non-rigid point set registration: Coherent point drift," In: Advances in Neural Information Processing Systems (2006) 1009-1016.
Meng, X.L., "Maximum likelihood estimation via the ECM algorithm: A general framework," Biometrika 80(2) (1993) 267-278.
Stoyanov, T., et al., "Point set registration through minimization of the L2 distance between 3D-NDT models, "IEEE International Conference on Robotics and Automation (2012) 5196-5201.
Hetverikov, D., et al., "The trimmed iterative closest point algorithm," in Pattern Recognition (2002) Proceedings, 16th International Conference on, vol. 3, IEEE (2002) 545-548.
Pomerleau, F., et al., "Comparing ICP Variants on Real-World Data Sets," Autonomous Robots 34(3) (Feb. 2013) 133-148.
Zhou, Q.Y., et al., "Dense scene reconstruction with points of interest," ACM Transactions on Graphics 32(4) (2013) 112.
Lalonde, J., et al., "Scale selection for classification of Point-Sampled 3D surfaces," Fifth International Conference on 3D Digital Imaging and Modeling (3DIM'05), Ottawa, ON, Canada (2005) 285-292.
Unnikrishnan, R., et al, "Scale selection for the analysis of point-sampled curves," In 3D Data Processing Visualization and Transmission, International Symposium on. vol. 0, Los Alamitos, CA, USA, IEEE Computer Society (2006) 1026-1033.
Low, K.L., "Linear least-squares optimization for point-to-plane icp surface registration," Chapel Hill, University of North Carolina 4 (2004).

* cited by examiner

FAST MULTI-SCALE POINT CLOUD REGISTRATION WITH A HIERARCHICAL GAUSSIAN MIXTURE

CROSS-REFERENCE TO RELATED APPLICATIONS

This application claims the benefit of U.S. Provisional Application No. 62/656,286 titled "Fast Multi-Scale Point Cloud Registration with a Hierarchical Gaussian Mixture", filed Apr. 11, 2018, the entire contents of which is incorporated herein by reference.

TECHNICAL FIELD

The present disclosure relates to data processing. More specifically, the present disclosure relates to three-dimensional (3D) registration algorithms.

BACKGROUND

Point cloud registration refers to a task for aligning two or more point clouds by estimating relative transformations between the point clouds. Point cloud registration sits at the core of many important and challenging 3D perception problems including autonomous navigation, object/scene recognition, and augmented reality (AR).

Conventional techniques for registering one point cloud to another point cloud include an Iterative Closest Point (ICP) algorithm, and variants, that is based on an iterative matching process where point proximity establishes candidate point pair sets. Given a set of point pairs, a rigid transformation that minimizes the sum of squared point pair distances can be calculated efficiently using equations that have a closed form solution. However, the traditional ICP algorithms perform poorly when the collected point cloud data is noisy, exhibits uneven point density, suffers from occlusions in the scene, or when large displacements cause a large proportion of points to have invalid matches.

Newer techniques have attempted to solve the deficiencies of the traditional ICP algorithms by using statistical models to represent the point cloud data. However, many of these newer techniques are significantly slower than the traditional ICP algorithms and only offer marginal improvement in all but a few scenarios. As a result, the traditional ICP algorithms are still used predominantly in real-world applications where real-time results are required. Therefore, there is a need for addressing these issues and/or other issues associated with the prior art.

SUMMARY

A method, system, and computer-readable media are disclosed for applying a registration algorithm to point cloud data. A reference point cloud is represented by a hierarchy of mixture distributions encoded in a hierarchical tree data structure. A target point cloud is registered to the reference point cloud by executing an Expectation-Maximization algorithm. The EM algorithm iterates through a number of cycles where, during an Expectation step, each point in the target point cloud is associated with a node of the hierarchical tree data structure and, during a Maximization step, an estimated transformation is determined based on the association of the points with corresponding nodes of the hierarchical tree data structure. The estimated transformation is determined by solving a minimization problem associated with a maximum likelihood estimation (MLE) criteria comprising a sum, over a number of mixture components, over terms related to a Mahalanobis distance.

In some embodiments, a method for implementing a registration algorithm includes the steps of obtaining a hierarchical tree data structure that represents first point cloud data, receiving second point cloud data, and registering the second point cloud data to the first point cloud data utilizing the hierarchical tree data structure to identify an estimated transformation. Each node of the hierarchical tree data structure includes parameters for a mixture distribution that represents at least a portion of the first point cloud data.

In some embodiments, the registration algorithm comprises an expectation maximization algorithm that is executed by at least one parallel processing unit. The expectation maximization algorithm includes: an expectation step configured to implement a recursive search of the hierarchical tree data structure to associate each point in the second point cloud data with a node of the hierarchical tree data structure; and a maximization step configured to determine the estimated transformation based on the association of the points in the second point cloud data with corresponding nodes of the hierarchical tree data structure. The expectation maximization algorithm comprises iteratively alternating between the expectation step and the maximization step for a number of cycles to converge on an optimal transformation.

In some embodiments, the expectation step implements an adaptive selective scaling criteria where, at each node during the recursive search of the hierarchical tree data structure, the processing unit compares a heuristic value for each mixture component included in the mixture distribution for the node to an adaptive threshold value to determine whether to terminate the recursive search for a particular child node of the node associated with the mixture component.

In some embodiments, the expectation step comprises, for each point object in the second point cloud data, calculating, for each mixture component associated with the node associated with the point object, a correspondence value for the mixture component in accordance with the following equation:

$$E[c_{ij}] = \frac{\pi_j N(Z_i | \Theta_j)}{\sum_{k=1}^{J} \pi_k N(Z_i | \Theta_k)}.$$

In some embodiments, the heuristic value is based on eigenvalues associated with a covariance matrix identified for a particular mixture component included in the mixture distribution of the node. In one embodiment, the heuristic value is a ratio comparing the smallest eigenvalue for the mixture component to a sum total of the eigenvalues for the mixture component.

In some embodiment, the maximization step solves a minimization problem for a maximum likelihood estimation (MLE) criteria using a weighted least squares technique.

In some embodiments, the maximization step comprises, for each mixture component included in the hierarchical tree data structure: calculating a first parameter for the mixture component in accordance with the following equation:

$$\pi_j^* = \frac{\sum_i \gamma_{ij}}{N};$$

and calculating a second parameter for the mixture component in accordance with the following equation:

$$\mu_j^* = \frac{\sum_i \gamma_{ij} z_i}{\sum_i \gamma_{ij}}.$$

In some embodiments, the maximization step further comprises identifying a transformation by minimizing a maximum likelihood estimation (MLE) criteria using a weighted least squares technique, wherein the MLE criteria comprises a sum over J mixture components included in the hierarchical tree data structure in accordance with the following equation:

$$\hat{T} = \underset{T}{\arg\min} \sum_{j=1}^{J} \sum_{l=1}^{3} \frac{\pi_j^*}{\lambda_{jl}} (n_{jl}^T (T(\mu_j^*) - \mu_j))^2.$$

In some embodiments, the method further includes the steps of: receiving the first point cloud data, and generating the hierarchical tree data structure. The first point cloud data can be captured by one or more active sensors or, alternatively, read from a memory. In one embodiment, generating the hierarchical tree data structure comprises iterating through a second expectation maximization algorithm to generate the hierarchical tree data structure. The second expectation maximization algorithm can comprise clustering points based on a clustering algorithm and then calculating the parameters for a distribution function for each of the clusters.

In some embodiments, each node of the hierarchical tree data structure represents at least a portion of the first point cloud data using a mixture distribution that includes a number of Gaussian distributions and a uniform distribution. In other embodiments, each node of the hierarchical tree data structure represents at least a portion of the first point cloud data using a mixture distribution that includes eight Gaussian distributions. In some embodiments, the hierarchical tree data structure is implemented as a tree with at least two levels of granularity, each node of the tree having a branching factor of 8.

In some embodiments, a system is disclosed for executing the registration algorithm. The system includes a memory and a processing unit. The memory stores the hierarchical tree data structure and a data structure that encodes the second point cloud data. The processing unit is configured to execute at least a portion of the expectation maximization algorithm. In some embodiments, the system includes one or more active sensors configure to capture the second point cloud data. The active sensors can also be configured to capture a first point cloud data, which can be analyzed to generate the hierarchical tree data structure.

In some embodiments, the processing unit includes multiple cores, each core configured to process at least a portion of the registration algorithm in parallel. In some embodiments, the processing unit is a parallel processing unit. In some embodiments, the system includes at least two parallel processing units connected through a high-speed interconnect.

In some embodiments, a non-transitory computer readable media is disclosed for storing computer instructions that, when executed by one or more processors, cause the one or more processors to perform the registration algorithm. The non-transitory computer readable media can comprise a non-volatile memory device.

DETAILED DESCRIPTION

Figure 1:
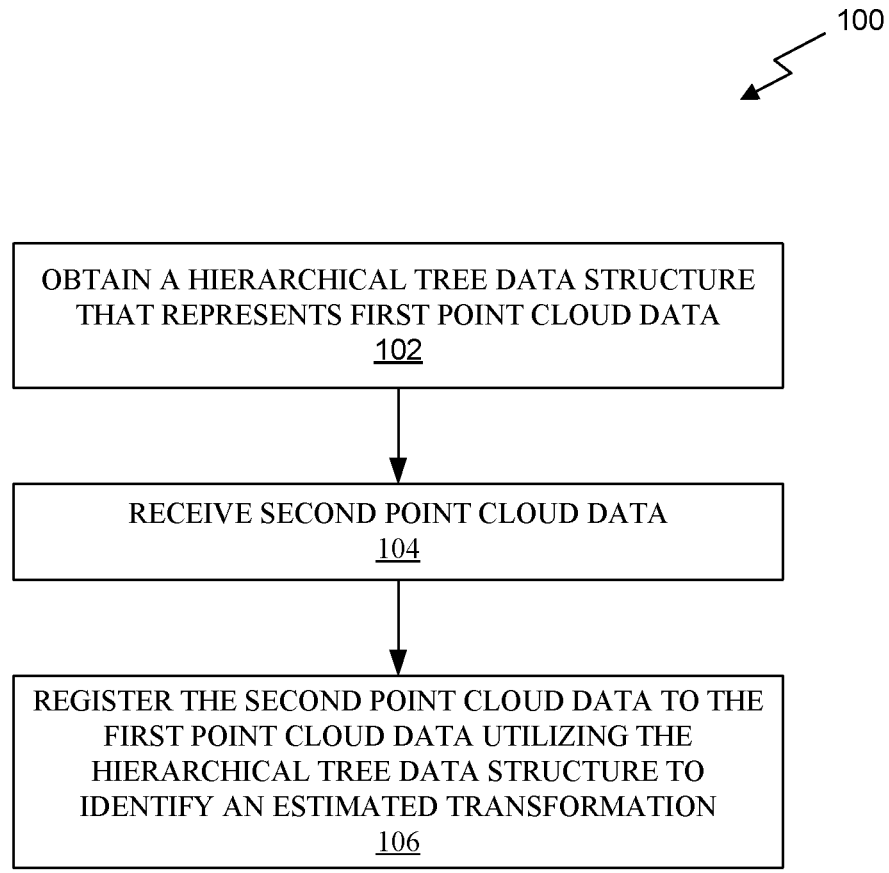
FIG. 1 illustrates a flowchart of a method for registering point cloud data, in accordance with some embodiments.

A complex set of geometry can be modeled as a set of planar surfaces, each surface having a surface normal vector. Point cloud data associated with the set of surfaces can be captured with active sensors such as depth cameras, LiDAR, or other similar technology. However, such sensors can be limited in accuracy and/or resolution. For example, a single configuration of a point cloud capturing device may capture lots of points of geometry close to the device but may only capture a small number of points for geometry further from the device. One technique for representing the point cloud data in a compact way is using Gaussian Mixture Models (GMMs).

The points in the point cloud can be clustered and the point cloud data in each cluster can be represented by a set of parameters that define the characteristics of the GMM. For example, each set of points in a cluster j can be represented by a mean ($\mu_j$) and a covariance matrix ($\Sigma_j$), in three dimensions, which defines a probability density function that the cluster j generated a particular point $z_i$. Various algorithms can be used for dividing the point cloud data into a number of clusters.

One common problem when processing point clouds is registering a target point cloud to a reference point cloud. In other words, a registration algorithm is configured to identify a transformation that most closely matches the data in the target point cloud to the reference point cloud. A registration algorithm is disclosed below that analyzes point cloud data with respect to a hierarchy of mixture distributions that is used to represent a reference point cloud. In some embodiments, the hierarchy of mixture distributions comprises a hierarchical tree data structure of mixture distributions, where each node in the hierarchical tree data structure encodes parameters for a mixture distribution having a number of mixture components. For example, each node can encode parameters for any number of Gaussian distribution functions and a uniform distribution function that represent a convex combination of probability density functions. Each node represents at least a portion of the reference point cloud.

The registration algorithm is implemented as an expectation maximization algorithm that executes a number of iterative cycles to identify an optimal transformation that registers the target point cloud data to the reference point cloud. In the expectation step, the registration algorithm determines associations between points in the target point cloud and nodes of the hierarchical tree data structure. The association for each point is determined by performing a recursive traversal of the hierarchical tree data structure to identify the maximum likelihood probability that a particular mixture component included in a mixture distribution of the hierarchical tree data structure is associated with the point. The registration algorithm can also implement an adaptive selection scaling criteria to stop the recursive traversal based on a heuristic value, thereby saving time when finer levels of granularity are not necessary to describe a particular point. The adaptive selection scaling criteria can significantly speed up the registration algorithm. The expectation step can include calculation of correspondence values that link the point with each of one or more mixture components in a relative manner.

In the maximization step, the registration algorithm calculates parameters for an optimized maximum likelihood estimation criteria that is a sum, over the mixture components of the hierarchical tree data structure, of terms related to a Mahalanobis distance between the points and a corresponding mixture component. The sum can be calculated efficiently by first determining parameters corresponding to each mixture components for all of the points associated with the mixture component during the expectation step. The transformation can then be identified by solving a minimization problem for the maximum likelihood estimation criteria, varying the transformation, using a weighted least squares technique.

The expectation and maximization steps can be repeated over a number of iterative cycles to refine the determined transformation based on finding new associations between transformed points of the target point cloud and the nodes of the hierarchical tree data structure.

FIG. 1 illustrates a flowchart of a method 100 for registering point cloud data, in accordance with some embodiments. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of implementing at least a portion of the EM algorithm. Furthermore, persons of ordinary skill in the art will understand that any system that performs method 100 is within the scope and spirit of embodiments of the present disclosure.

At step 102, a hierarchical tree data structure is obtained that represents first point cloud data. In some embodiments, each node of the hierarchical tree data structure encodes parameters for a mixture distribution. More specifically, each node encodes parameters for a weighted sum of mixture components, where each mixture component represents a distribution function. In one embodiment, each node is a combination of a number of Gaussian distribution functions and a uniform distribution function. Each Gaussian distribution function is associated with a weight it and can be encoded with a mean, $\mu$, and a covariance matrix, $\Sigma$. In one embodiment, each node is a mixture of eight Gaussian distribution functions and one uniform distribution function and can be referred to as a Gaussian+Uniform Mixture Model. The inclusion of the uniform distribution adds robustness to the representation by associating sample outliers with the uniform distribution when the probability that the sample is associated with one of the Gaussian distribution functions is very low. In another embodiment, each node is a mixture of eight Gaussian distribution functions, without the uniform distribution, and can be referred to as a Gaussian Mixture Model. In yet other embodiments, each node is a mixture of a different number of distribution functions (e.g., 2, 4, 16, etc.).

In some embodiments, each node of the hierarchical tree data structure has a number of child nodes. The number of child nodes is at least two. Each child node of the hierarchical tree data structure increases the granularity of a particular mixture component of the parent node by representing that mixture component as a separate mixture distribution. In some embodiments, the number of child nodes is eight, which can be referred to as a tree having a branching factor of eight. While conventional octrees are used to partition a 3D space into eight octants, the child nodes in a hierarchical tree of mixture distributions having a branching factor of eight overlap in 3D space because each child node represents a mixture distribution that is continuous and overlapping in the 3D space.

At step 104, second point cloud data is received. In some embodiments, the second point cloud data is encoded as an array of vectors, each vector including a number of components that represent a point in space via the dimensions of a coordinate system for the space. In the typical case, the space is a 3D space represented in Cartesian coordinates including an x-coordinate, a y-coordinate, and a z-coordinate. However, the points could be represented by another coordinate system such as radial coordinates, spherical coordinates, or the like.

In some embodiments, the second point cloud data is captured by a sensor and stored in a memory. The point cloud data can be captured with active sensors such as depth cameras, LiDAR, or other similar technology. In other embodiments, the point cloud data can be sampled from a model of complex geometry. In other words, the point cloud data can be generated by computer-generated techniques such as ray-tracing where the point cloud is generated from a virtual model of a number of objects comprising surfaces or volumes.

At step 106, the second point cloud data is registered to the first point cloud data utilizing the hierarchical tree data structure to identify an estimated transformation. In some embodiments, the estimated transformation is a rigid transformation, with six degrees of freedom (translation in three dimensions plus rotation around three axes). The estimated transformation is a maximum likelihood estimation for the transformation that registers the second point cloud data to the first point cloud data.

In some embodiments, the estimated transformation is identified using an Expectation-Maximization (EM) algorithm that includes iteratively alternating between an expectation step (E step) and a maximization step (M step) for a number of cycles to converge on an optimal transformation.

The E step is configured to implement a recursive search of the hierarchical tree data structure to associate each point in the second point cloud data with a node of the hierarchical tree data structure. In other words, the hierarchical tree of mixture distributions is traversed to find a particular mixture distribution that is most likely associated with each point in the second point cloud data. The traversal includes calculating a probability for the point for each mixture component of the mixture distribution for the node and traversing to the child node associated with the mixture component corresponding to the maximum probability value. The traversing step is repeated (i.e., in a recursive procedure) for the selected child node until either the traversal reaches a child node that is a leaf node (i.e., has no children) or where an adaptive threshold indicates the recursion can be terminated. The adaptive threshold can be a measure of complexity of the distribution function for a particular mixture component.

The M step is configured to determine the estimated transformation based on the association of points in the second point cloud data structure with the corresponding nodes of the hierarchical tree data structure. In some embodiments, the M step determines a particular transformation, T, that minimizes a weighted sum of a maximum likelihood estimation (MLE) criteria for the points in the second point cloud. In some embodiments, the MLE criteria is based on the Mahalanobis distance between the transformed point and each of the mixture components in the mixture distribution for the node associated with the point.

The EM algorithm iterates through a number of cycles. The transformation estimated from the previous M step is used to calculate the MLE criterion for the transformed points in the subsequent M step. The number of iterations or cycles of the EM algorithm can be pre-defined or the iteration can be terminated dynamically based on a convergence criteria.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
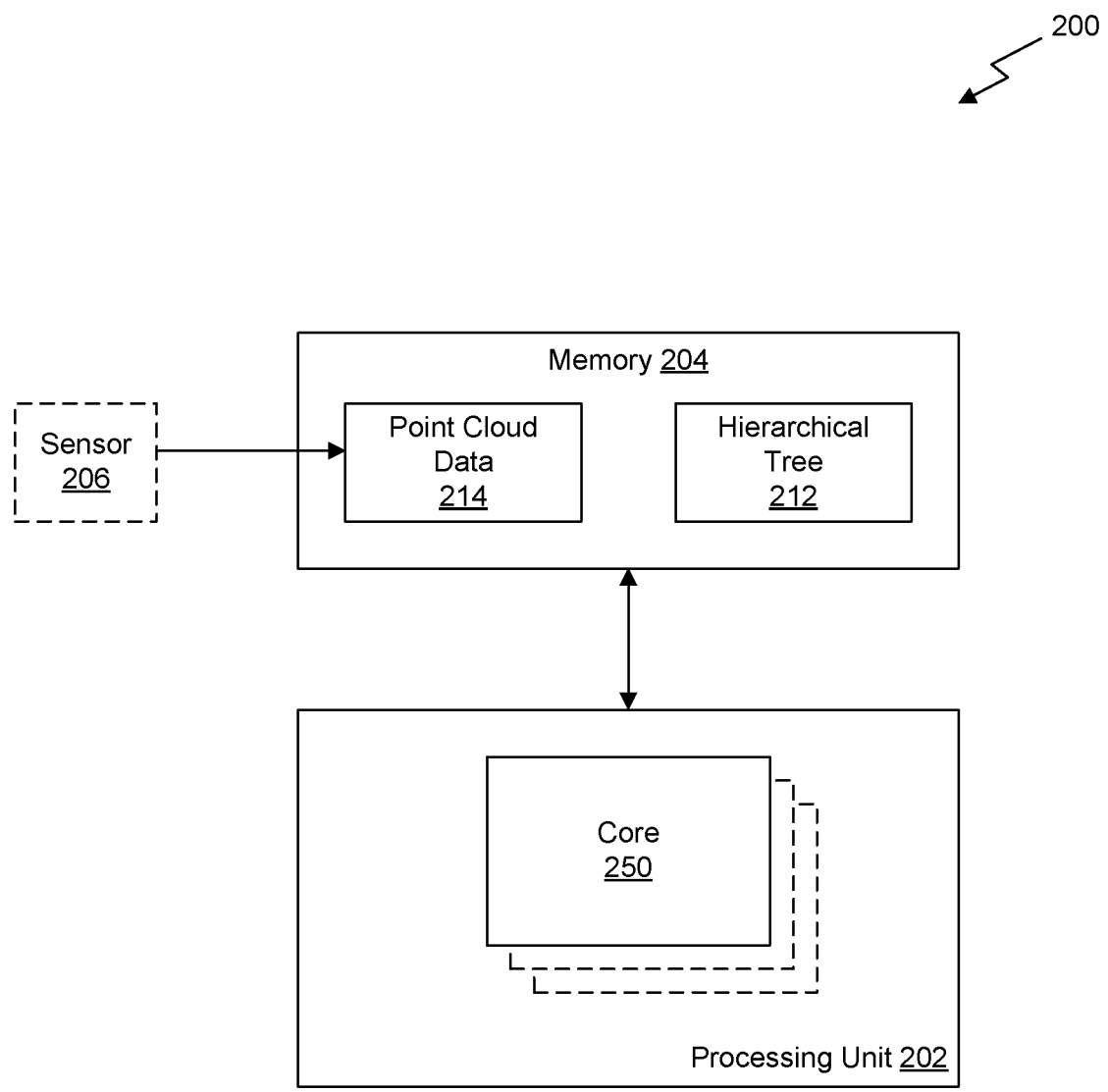
FIG. 2 illustrates a system for registering point cloud data, in accordance with some embodiments.

FIG. 2 illustrates a system 200 for registering point cloud data, in accordance with some embodiments. The system 200 includes a processing unit 202 coupled to a memory 204. The processing unit 202 includes one or more cores 250 configured to execute instructions stored in the memory 204. In some embodiments, the processing unit 202 is multi-cored such that instructions can be executed in parallel with each core having separate state including, for example, program counters, registers, flags, and so forth.

The memory 204 can be volatile memory such as a dynamic random access memory (DRAM). The memory 204 stores instructions and data and is coupled to the processor via a memory interface. In operation, the memory 204 can store the hierarchical tree data structure 212 and point cloud data 214. In some embodiments, the memory 204 is coupled to a bus or interface that is connected to non-volatile storage such as hard disk drives (HDDs), solid state drives (SSDs), flash memory, or the like. Memory pages can then be stored on the non-volatile storage and loaded into the memory 204 as needed such that a virtual memory system with a larger addressable memory space can be implemented in a smaller physical volatile memory device.

In some embodiments, the system 200 can also include an optional sensor 206. The sensor 206 can be configured to capture point cloud data 214 and store the point cloud data 214 in the memory 204. The processing unit 202 can then access the point cloud data 214 and the hierarchical tree data structure 212 in the memory 204 to perform a registration task on the point cloud data 214. The registration task can be implemented in the processing unit 202 by executing a set of instructions configured to process the point cloud data 214 in accordance with an algorithm.

In some embodiments, the processing unit 202 implements the EM algorithm to process the point cloud data 214 and register the point cloud data 214 to the point cloud represented by the hierarchical tree data structure 212. It will be appreciated that the number of points in the point cloud data can be quite large, up to millions of individual point samples, and that the EM algorithm can be run faster utilizing data parallelism. More specifically, the processing unit 202 can include multiple cores 250, with each core processing different data from the point cloud data 214 or different portions of the EM algorithm in parallel. In exemplary embodiments, each core 250 can also comprise a vector processor or SIMD (single-instruction, multiple data) engine to process multiple data (e.g., multiple points) in parallel. A more completion description of an exemplary parallel processing unit 202 is described below.

Parallel Processing Architecture

Figure 3:
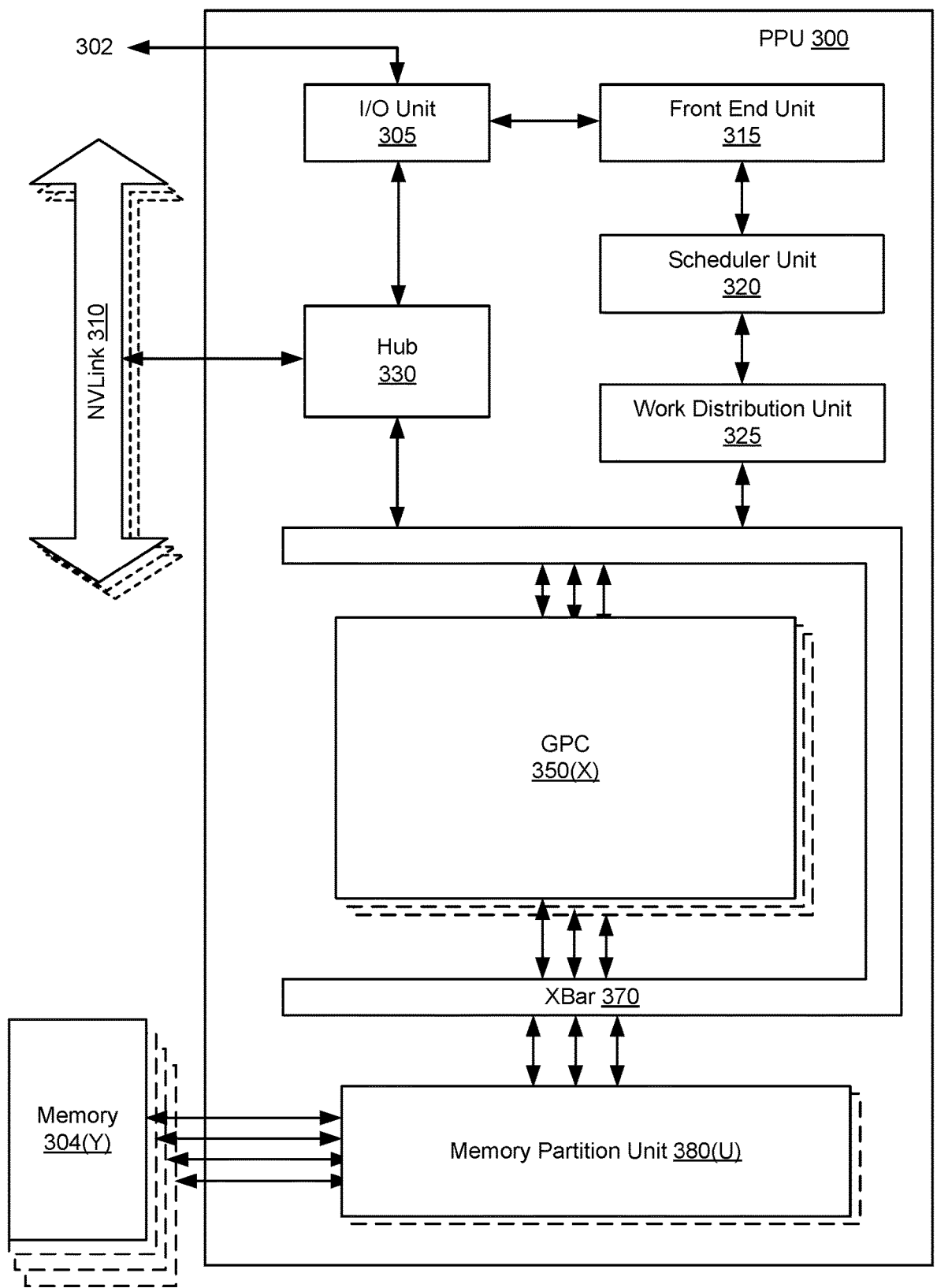
FIG. 3 illustrates a parallel processing unit, in accordance with an embodiment.

FIG. 3 illustrates a parallel processing unit (PPU) 300, in accordance with some embodiments. The PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including: autonomous vehicle platforms; deep learning; high-accuracy speech, image, and text recognition systems; intelligent video analytics; molecular simulations; drug discovery; disease diagnosis; weather forecasting; big data analytics; astronomy; molecular dynamics simulation; financial modeling; robotics; factory automation; real-time language translation; online search optimizations; personalized user recommendations; and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnects. The PPU 300 may also be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units (not explicitly shown) of the PPU 300 such as one or more copy engines, a video encoder, a video decoder, a power management unit, etc. The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units (not explicitly shown) of the PPU 300 such as one or more copy engines, a video encoder, a video decoder, a power management unit, etc. In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
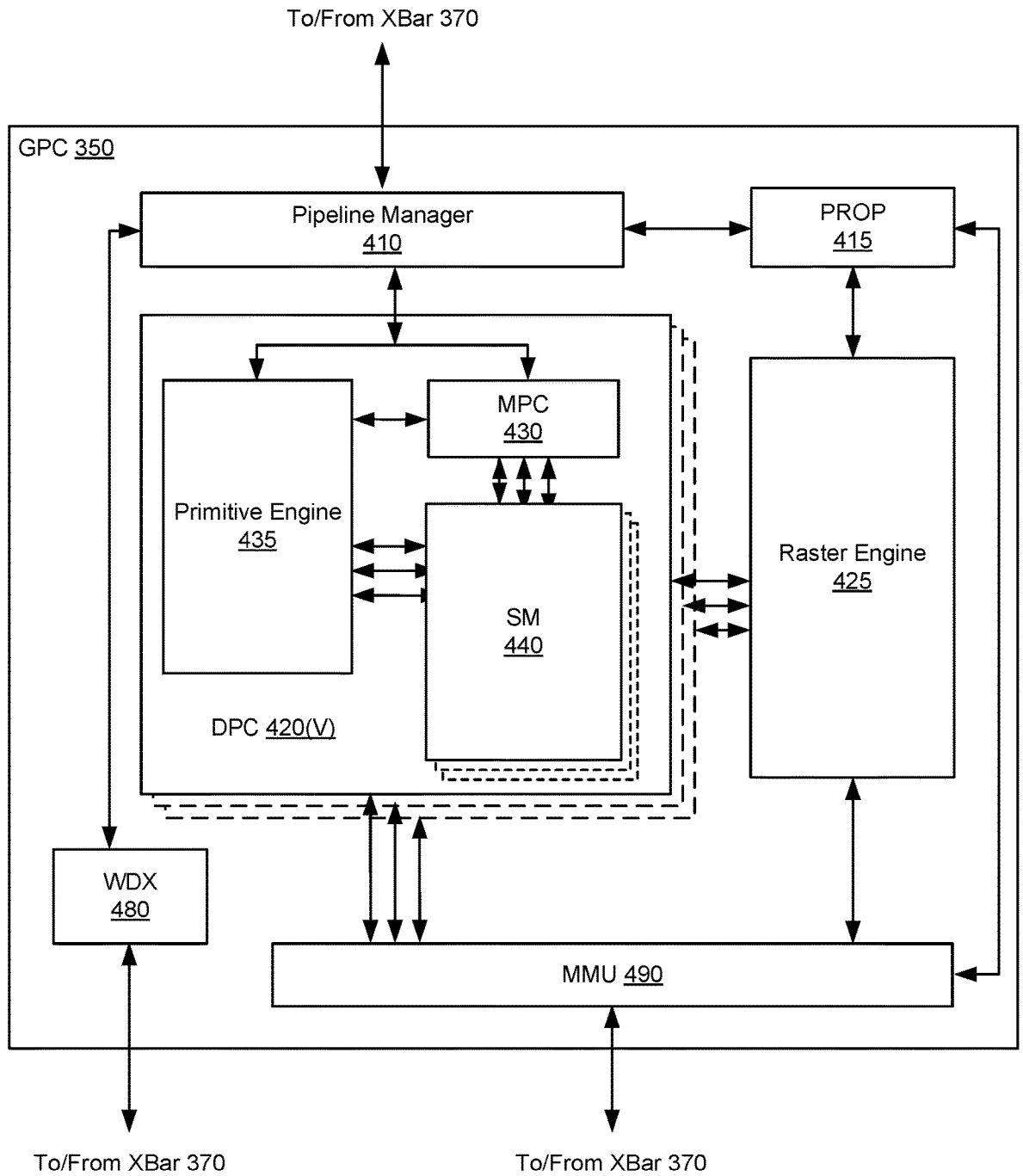
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
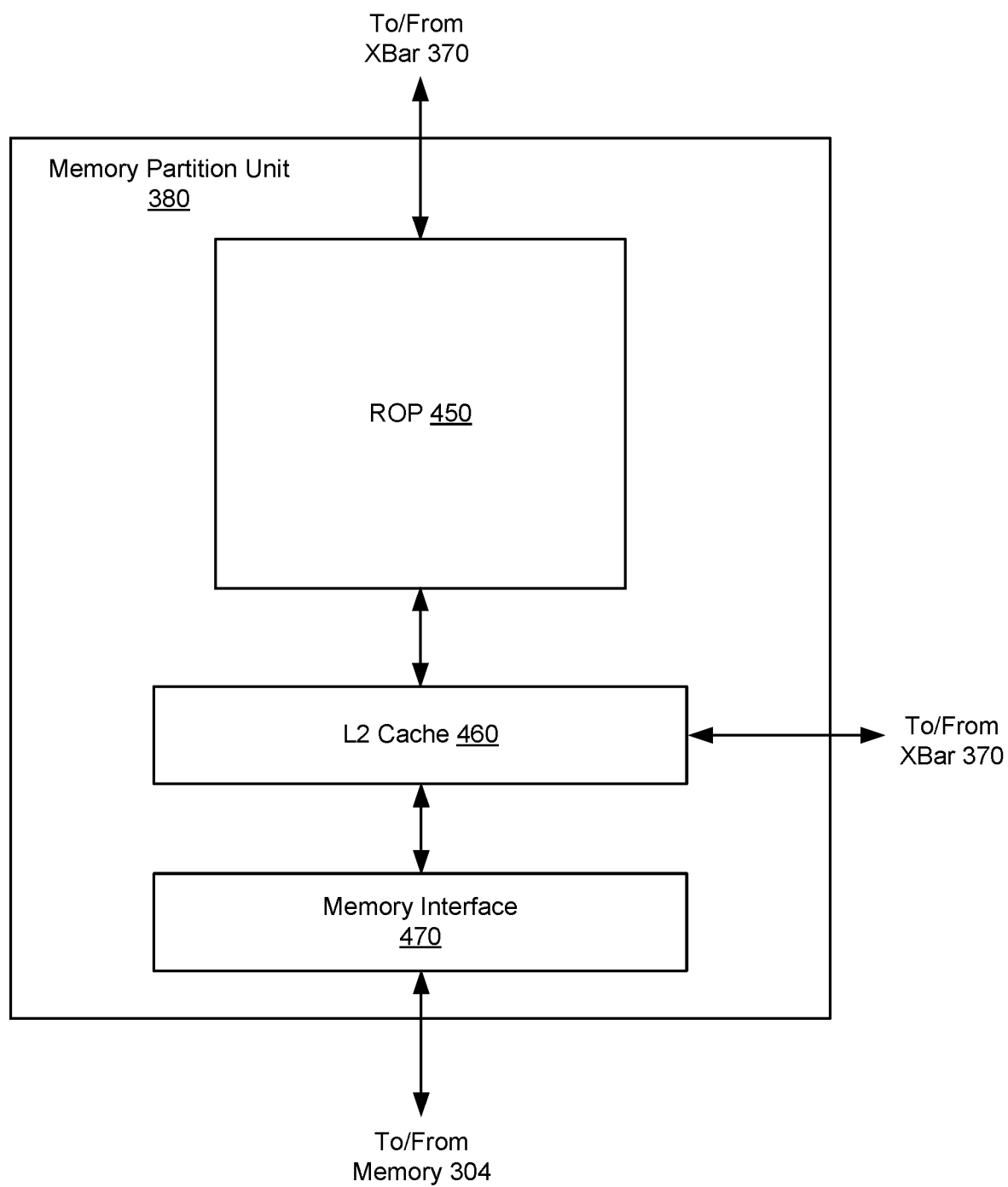
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32-bit, 64-bit, 128-bit, 1024-bit data buses, or the like, for high-speed data transfer. In an embodiment, the PPU 300 incorporates Y memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In some embodiments, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment, the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In some embodiments, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
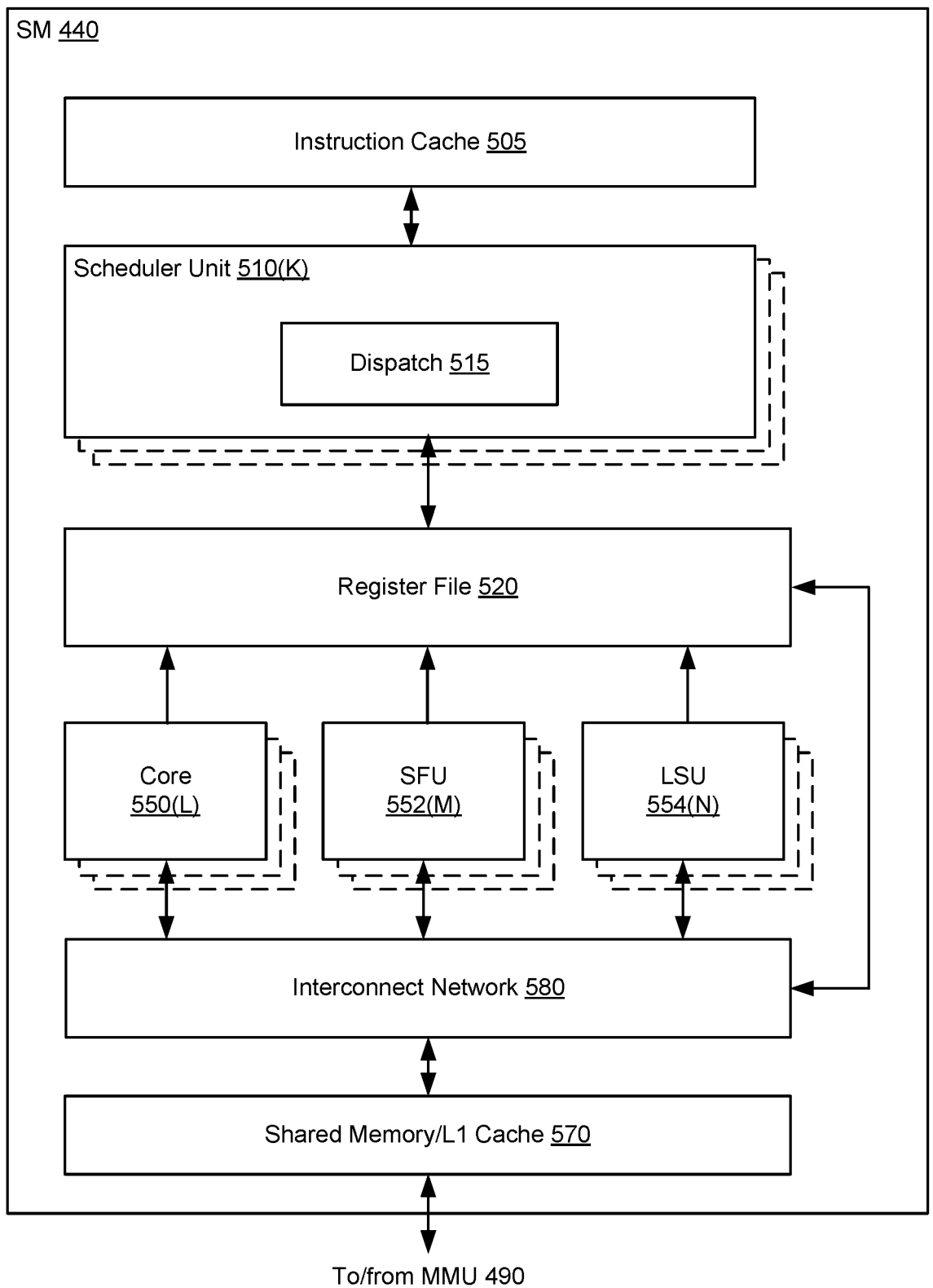
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, and a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in some embodiments, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as the CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In some embodiments, the SFUs 552 may include one or more texture units configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 570. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 as well as between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity as a cache. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, using the shared memory/L1 cache 570 to communicate between threads, and using the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
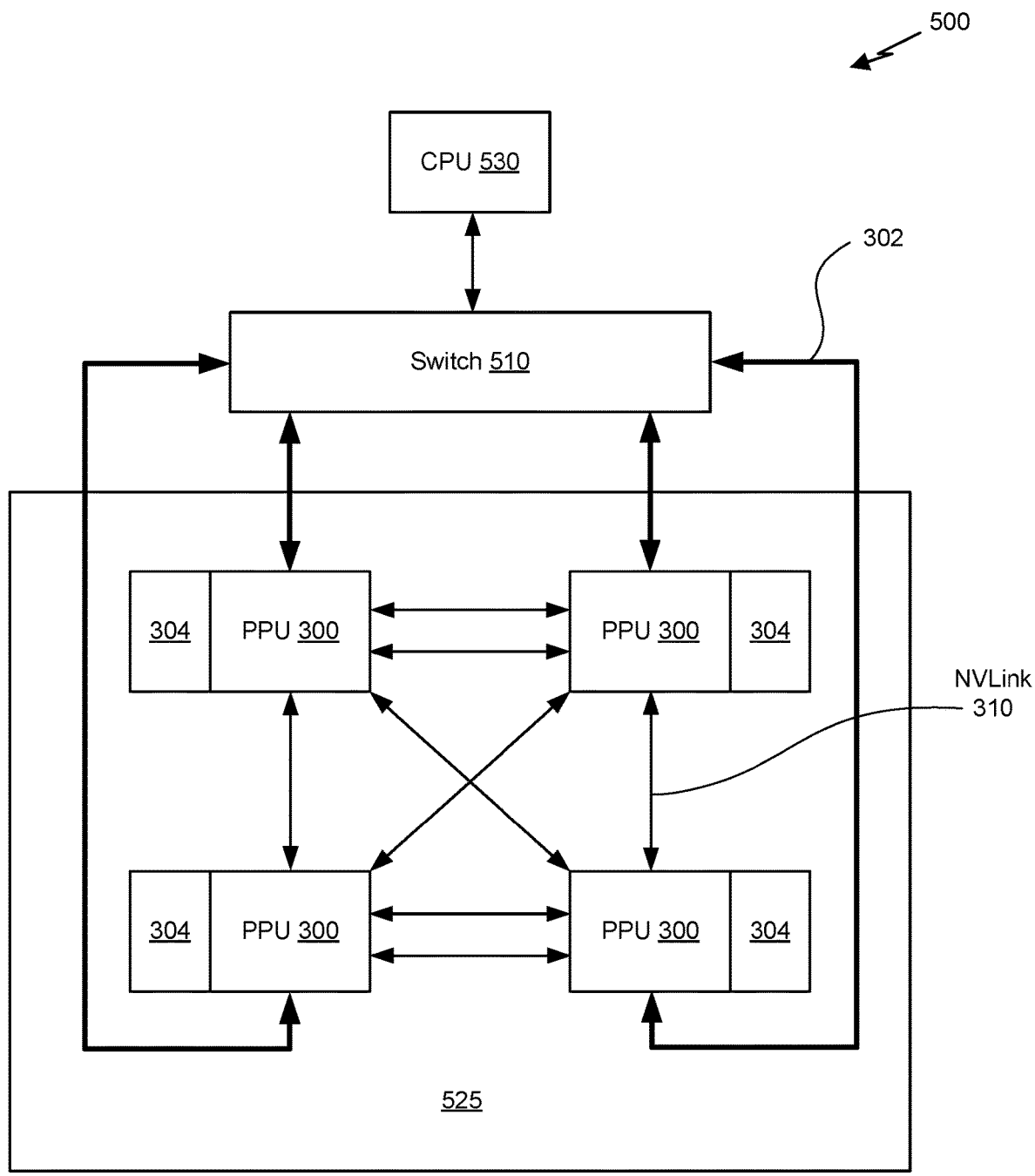
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, a switch 510, and multiple PPUs 300 each coupled to respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabits/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
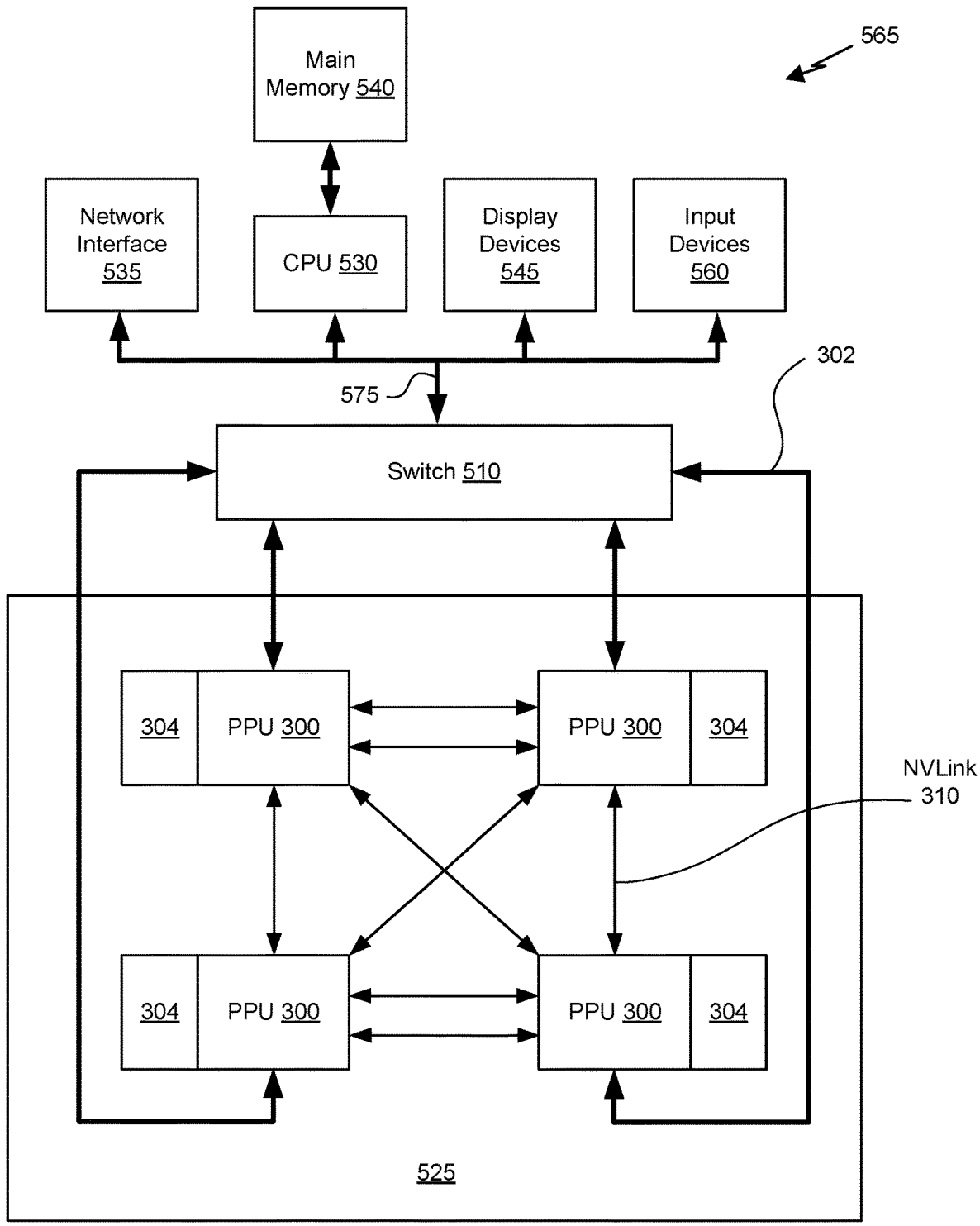
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, or universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an applicationspecific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Hierarchical Tree of Mixture Distributions

As used herein, point cloud data refers to information associated with a set of points. Each point is defined as a set of coordinates that identifies a position for the point in a three-dimensional Euclidean space. In one embodiment, each point can be defined in a Cartesian Coordinate System as having an x-coordinate, a y-coordinate, and a z-coordinate. In other embodiments, each point can be defined using coordinates of another type of coordinate system, such as radial or spherical coordinates. In some embodiments, each point can also be associated with other data in addition to the position coordinates for the point. For example, each point can be associated with a color value having one or more components, a property associated with the point in space (e.g., density, temperature, etc.), or the like. However, it will be appreciated that the registration algorithm described below only requires the position data for the points and, therefore, any additional data, if included in the point cloud data, can be discarded or ignored by the registration algorithm.

Figure 6A:
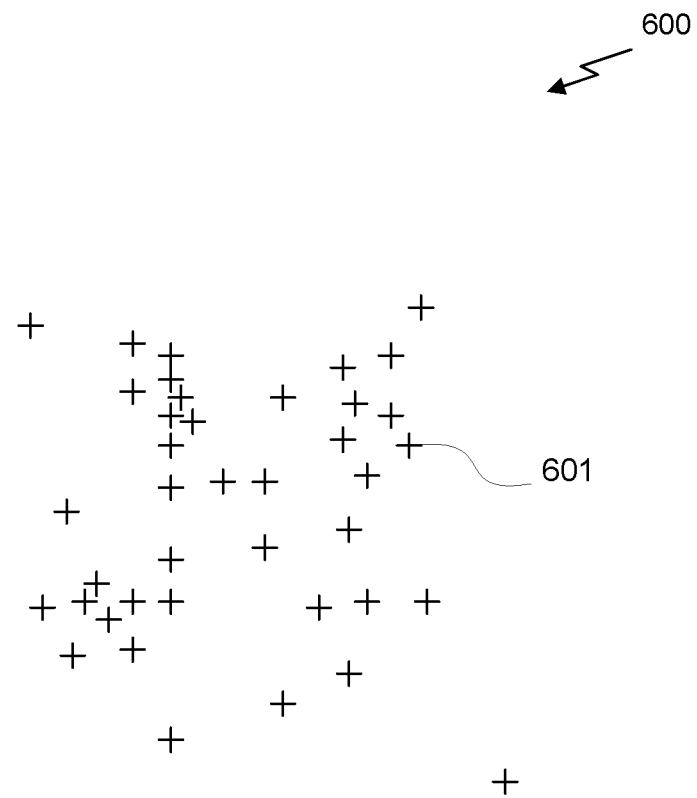
FIGS. 6A-6C illustrate a technique for representing point cloud data using mixture distributions of various granularity, in accordance with some embodiments.
Figure 6B:
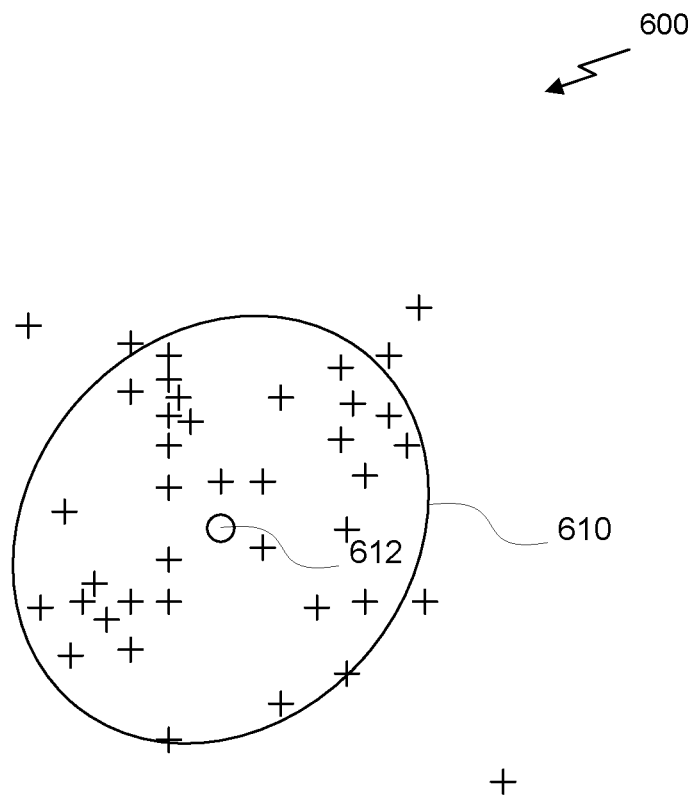
Figure 6C:
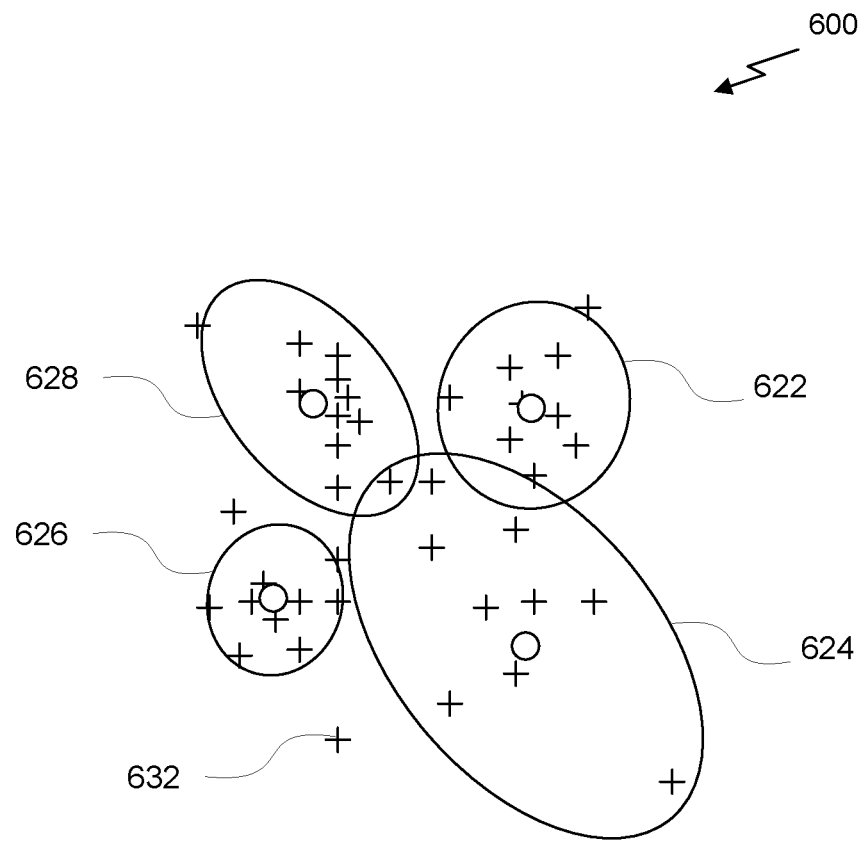

FIGS. 6A-6C illustrate a technique for representing point cloud data using mixture distributions of various granularity, in accordance with some embodiments. As shown in FIG. 6A, a point cloud 600 includes a number of point objects 601. Each point object 601 is a vector storing a number of components that locate the point object 601 in space. In some embodiments, the point object 601 stores a three component vector including scalar values for an x-coordinate, a y-coordinate, and a z-coordinate. In some embodiments, the scalar values are encoded in a floating point format. For example, the scalar values for a position for the point object 601 can be encoded as 16-bit or 32-bit floating point values. In other embodiments, the scalar values can be encoded using other formats.

In some embodiments, the point cloud 600 is generated by one or more active sensors such as depth cameras, LiDAR, or other similar technology. The active sensors can be configured to scan a space and create the point objects 601 in the point cloud 600. The number of point objects 601 included in the point cloud 600 can be very large, numbering in the hundreds of thousands, millions, or even billions of point objects 601. In some embodiments, the size of a point cloud 600 can be limited, either by the configuration of the active sensors or by filtering the point objects 601 added to the point cloud 600. Limiting the number of point objects 601 included in a point cloud 600 can be necessary to reduce the time to process the point cloud 600 for time-sensitive tasks. For example, real-time autonomous driving applications may need to register a point cloud in real-time in order to apply an estimated transformation identified via a registration algorithm to a control system for the vehicle.

In other embodiments, the point cloud 600 can be generated by a rendering algorithm that is implemented, at least in part, by a graphics processing pipeline. For example, a model of complex geometry (e.g., 3D surfaces) can be rendered using ray-tracing techniques to generate point objects 601 where rays intersect with the geometry. In yet other embodiments, an algorithm can be configured to read geometry from a model and translate the geometry into point objects 601 directly, such as by randomly generating point objects 601 on the surface of a triangle, quad, triangle fan, or mesh object. These simulated point clouds can be utilized to test the registration algorithm, described below, using known rigid transformations of the model geometry. However, simulated point clouds have many other uses including creating training data sets for deep learning neural networks or to test control systems that utilize point cloud data as sensor inputs.

Data structures for storing the point cloud 600 can be quite large, given that each point object 601 can be, e.g., 16 bytes for 4 component vectors in FP32 (32-bit floating point) format, where twelve bytes store the position information and four bytes can optionally store a parameter for the point object 601 such as a 32-bit RGB color value, for example. In cases where the point cloud 600 includes millions of point objects 601, then the total memory required to store the point cloud 600 can be many megabytes (MB) or even gigabytes (GB) in size. One solution to reduce the size of the point cloud 600 in memory is to represent the point objects 601 using an alternative representation.

One representation of the point cloud 600 that can significantly reduce the storage requirements is to represent clusters of point objects 601 as a distribution function. The distribution function, or the related probability density function, is a continuous function that identifies the probability that a random variable, such as the location of a point object, $z_i$, will take a value less than or equal to a particular point x. The cumulative distribution function is the integral of the probability density function for the random variable from negative infinity to the point x.

In one embodiment, the distribution functions selected for the representation are Gaussian basis functions. In one embodiment, as shown in FIG. 6B, a number of point objects 601 in the point cloud 600 can be represented by a single distribution function 610 specified by a mean $\mu$ and a covariance matrix $\Sigma$. The mean $\mu$ and the covariance matrix $\Sigma$ can be calculated directly from the positions of the set of point objects 601 represented by the distribution function 610. The mean $\mu$ is located at a position 612, the location where the probability density function for the set of point objects 601 is maximum. In some embodiments, the distribution function 610 is anisotropic, meaning the variance of each dimension of the position can vary independently. In other embodiments, the distribution function 610 can be limited to be isotropic in order to simplify calculations in algorithms that utilize the representation.

It will be appreciated that a single distribution function is not typically a good fit for real-world data. The point cloud 600 can be more accurately represented by a plurality of distribution functions, each distribution function representing a different subset of point objects 601 in the point cloud 600. More specifically, by clustering point objects 601 based on location in the space, the distribution functions for the clusters of point objects 601 are a more accurate representation of those point objects 601. It will be appreciated that the point objects 601 do not have to be located close to the mean μ of the distribution function in space to be accurately represented by the distribution function. For example, a distribution function that represents many points on a plane can accurately represent a set of points close to the plane even though many of those points can be spread out over the plane in space. Such distribution functions simply have large variances with respect to two orthogonal directions and a small variance with respect to the third orthogonal direction normal to the plane.

As shown in FIG. 6C, the point cloud 600 can be more accurately represented by four distribution functions 622, 624, 626, and 628 than compared to a single distribution function 610. The plurality of distribution functions can be referred to as a mixture distribution, where the mixture distribution comprises a weighted combination of the mixture components—distribution functions 622, 624, 626, and 628. Although the distribution functions shown in FIG. 6C can have similar basis functions with different parameters (e.g., Gaussian basis functions with different mean and covariance parameters), in some embodiments, the mixture distribution can combine distribution functions of different basis, such as by combining Gaussian distribution functions with a uniform distribution function. The uniform distribution function can help represent outlier point objects 601 that do not have a high probability of being represented by any of the other distribution functions (i.e., outliers).

Registration Algorithm

Registration algorithms to register a point cloud to a reference point cloud are well-known and include variants of the Iterative Closest Point (ICP) algorithm. More specifically, the ICP algorithms attempt to identify an optimal transformation that minimizes a difference between a reference point cloud and a transformed version of the point cloud being registered to the reference point cloud. The steps of the ICP algorithm roughly involve associating points in the point cloud to points in the reference point cloud based on the closest distance; estimating a transformation by minimizing a metric such as point to point distance; transforming the points in the point cloud based on the estimated transformation; and iterating through the steps using new associations based on the estimated transformation in the previous step. There are many variants of the ICP algorithm including variants that use point-to-point distance metrics and point-to-plane distance metrics. However, implementations of the ICP algorithm typically require certain assumptions or short cuts to reduce the complexity of the calculations that affect the results of the registration algorithm. A new registration algorithm is proposed that registers a point cloud to a reference point cloud represented by a hierarchy of mixture distributions.

The problem addressed by the registration algorithm can be defined as follows. Given a first point cloud, $Z_1$, and a second point cloud, $Z_2$, the registration algorithm attempts to maximize the data probability of the second point cloud $Z_2$ under a set of transformations, T, with respect to a probability model $\Theta_{Z_1}$ that is derived from the first point cloud $Z_1$. In other words, the registration algorithm solves for a transformation, T, where the most likely estimate of the transformation, $\hat{T}$, is the estimate that maximizes the probability that the samples of the transformed point cloud were generated by the probabilistic representation of spatial likelihood derived from the spatial distribution of the first point cloud $Z_1$, as follows:

$$\hat{T} = \arg\max p(T(Z_2)\hat{\Theta}_{Z_1}) \quad \text{(Eq. 1)}$$

The most common form for parameterizing the probability distribution in space is using Gaussian Mixture Models, as described above, which have a data probability defined as a convex combination of J Gaussian distribution functions weighted by the J-component weight vector π:

$$p(z|\Theta_{Z_1}) = \Sigma_{j=1}^{J} \pi_j N(z|\Theta_j) \quad \text{(Eq. 2)}$$

In some embodiments, the registration algorithm is implemented as an Expectation-Maximization (EM) algorithm that includes an Expectation step (E step) followed by a Maximization step (M Step). The EM algorithm provides an iterative process to solve for the transformation T through the introduction of a set of latent correspondence variables, $C=\{c_{ij}\}$, that dictate how the point objects 601 in the second point cloud $z_i \in Z_2$ probabilistically are associated with the J subcomponents of the model.

In the first step of the registration algorithm, a hierarchy of mixture distributions is identified that represents a reference point cloud, $Z_1$. In some embodiments, a data structure storing data for the hierarchy of mixture distributions is located in a memory and provided as an input to the registration algorithm. In other embodiments, data for a reference point cloud is read from memory or captured by one or more active sensors, and the hierarchy of mixture distributions is generated based on the point cloud data. Various algorithms exist for generating the hierarchy of mixture distributions from the point cloud data.

In one embodiment, an EM algorithm to generate the probability model for the point cloud is defined that divides the point objects for the reference point cloud into a number of clusters using a clustering algorithm. Each cluster is then analyzed to find parameters for a distribution function that forms a mixture component of the mixture distribution for a particular level of granularity. Each of those clusters of point objects can then be divided recursively into smaller and smaller clusters to create the hierarchy of mixture distributions at higher levels of granularity. A more detailed description of one such algorithm is described in U.S. patent application Ser. No. 15/055,440 (U.S. Publication No. 2017/0249401A1), filed Feb. 26, 2016, the contents of which are incorporated herein in their entirety.

Returning now to the registration algorithm, in some embodiments, the E step can utilize Bayes' rule to calculate expectations over the correspondences. For a particular point $z_i$, the expected correspondence to the mixture component $\Theta_j$ can be calculated as follows:

$$E[c_{ij}] = \frac{\pi_j N(Z_i|\Theta_j)}{\sum_{k=1}^{J} \pi_k N(Z_i|\Theta_k)} \quad \text{(Eq. 3)}$$

As seen above, the expectations of the correspondences associated with a particular point $z_i$ sum to one over all J mixture components. Larger J (i.e., more mixture components) is better, but has a negative impact on the time to calculate the correspondences as the time scales with complexity as $O(n^2)$. Thus, to combat the scaling problem caused by increasing J to better fit the data, one solution is to utilize a hierarchy of smaller scale probability models to represent the point cloud data at different levels of granularity.

Figure 7:
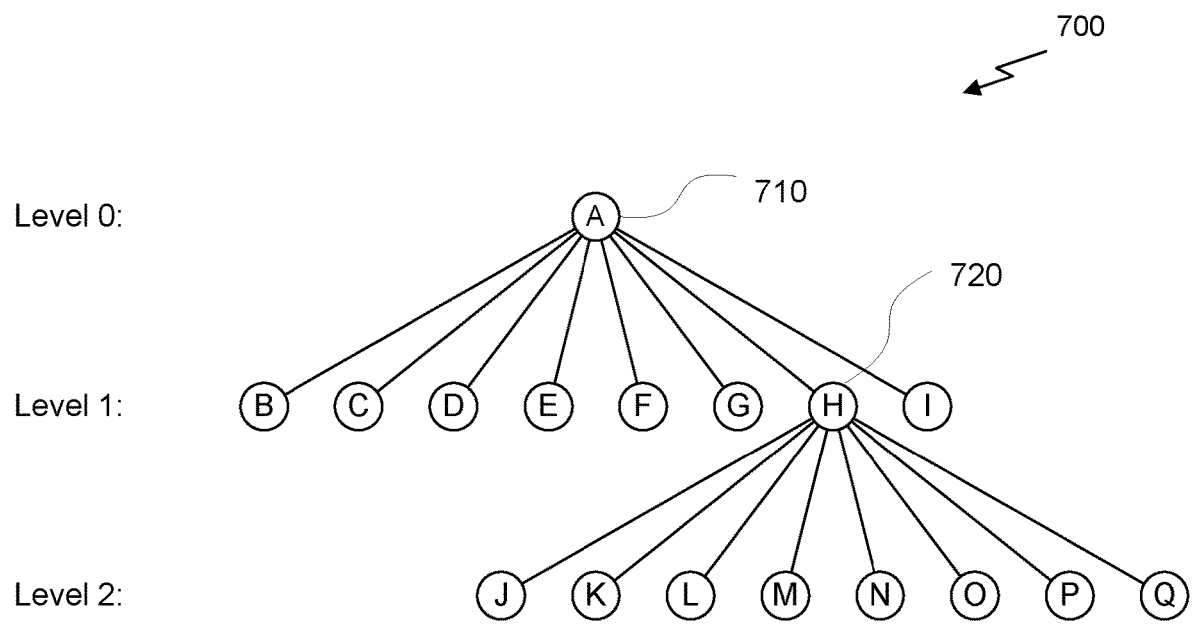
FIG. 7 illustrates a hierarchical tree data structure that encodes a probability model of a point cloud, in accordance with some embodiments.

FIG. 7 illustrates a hierarchical tree data structure 700 that encodes a probability model of a point cloud 600, in accordance with some embodiments. Each node in the hierarchical tree data structure 700 (represented by a circle surrounding a letter) encodes parameters for a mixture distribution that describes at least a portion of the point cloud 600. A root node 710 encodes a mixture distribution that represents the point cloud 600 at the lowest level of granularity. Each level of the hierarchical tree data structure 700 represents an increase in the level of granularity of the representation. As the level of granularity increases, the cumulative number of distinct distribution functions used to represent the point cloud 600 also increases.

Each mixture component in the mixture distribution for the root node 710 can be representative of a cluster of point objects 601 in the point cloud 600. The child node 720 of the root node 710 can encode a second mixture distribution that is different from the mixture distribution encoded in the root node 710. While the mixture distribution encoded by the root node 710 represents the entire set of point objects 601 in the point cloud 600, the mixture distribution encoded by the child node 720 represents only that portion of the point objects 601 in the point cloud 600 that are associated with a particular mixture component in the mixture distribution encoded by the root node 710. In other words, a single distribution function included as a mixture component in one level of the hierarchical tree data structure 700 can be divided into a mixture distribution of multiple mixture components at a greater level of granularity in the next level of the hierarchical tree data structure 700.

As shown in FIG. 7, in some embodiments, the hierarchical tree data structure 700 is a tree with a branching factor of 8. In other words, each node of the hierarchical tree data structure 700 has eight child nodes. Each child node corresponds to one of the mixture components of the mixture distribution encoded by the parent node. For example, a mixture distribution encoded by root node 710 can include eight Gaussian mixture components, each mixture component comprising a distribution function having a mean $\mu$ and covariance matrix $\Sigma$. Then, each child node corresponds with one of the Gaussian mixture components. Therefore, each level of the hierarchical tree data structure 700 increases the granularity of the representation of the point objects 601 by a factor of eight.

In other embodiments, the hierarchical tree data structure 700 can have a different number of child nodes per node such as 2, 4, or 16 child nodes per node. The branching factor selected can affect the speed of traversal and the number of calculations that need to be performed at each node during the traversal process. Increasing the branching factor can also lead to scaling problems, as discussed above for the non-hierarchy probability representation.

In some embodiments, each mixture distribution encoded by a node is a weighted combination of eight Gaussian distribution functions and a uniform distribution function. The data structure for encoding a node can include fields for the relative weights $\pi_j$ for each of the mixture components as well as parameters that specify each of the mixture components that make up the mixture distribution. The parameters for specifying a particular mixture component can include, in the case of a Gaussian distribution function, the values for the mean $\mu_j$ (i.e., three values for a three dimensional position in space) and the covariance matrix $\Sigma_j$ (i.e., nine scalar values for a three dimensional covariance matrix). In some embodiments, the parameters can also include eigenvalues corresponding to the eigenvectors for the covariance matrix $\Sigma_j$ such that the eigenvalues can be looked up in the node and do not have to be solved from the covariance matrix. In other embodiments, the parameters for the distribution function can include values for a plurality of moments of the distribution function such as, for example, the first three or four moments of the distribution function referred to as a mean parameter ($1^{st}$ Moment), a variance parameter ($2^{nd}$ Moment), a skewness parameter ($3^{rd}$ Moment), and/or a kurtosis parameter ($4^{th}$ Moment).

Traversing the hierarchical tree data structure 700 involves determining which node to associate with a particular sample location or point. The traversal begins at the root node 710, where the parameters for the mixture distribution can be read from the node. A correspondence value associated with each mixture component is calculated for the sample location, as given in Equation 3, set forth above. The correspondence values for the mixture components are compared and a child node having the largest correspondence value is selected. The traversal recursively repeats for the child node until the currently selected node is a leaf node (i.e., has no child nodes).

In some embodiments, where the mixture distribution encoded by each node is a Gaussian+Uniform Mixture Model, the Gaussian distribution mixture components are associated with child nodes and the uniform distribution mixture component is not associated with a child node. Because the uniform distribution function is utilized as a catch-all for outliers in the data set, the correspondence value for the Uniform distribution function is only higher than the correspondence values for all of the Gaussian distribution functions when the sample location is not well represented by any of the Gaussian distribution functions (i.e., when the probability value for each Gaussian distribution function is below a threshold probability value associated with the uniform distribution function that is constant in space). In such cases, the recursive traversal of the hierarchical tree data structure 700 can be stopped at the current node because the sample location is no longer well represented by additional mixture distributions at higher levels of granularity.

Although the hierarchical tree data structure 700 is illustrated as having three levels—the root level 0, a first hierarchical level 1, and a second hierarchical level 2—the hierarchical tree data structure 700 can include any number of hierarchical levels of at least two levels (i.e., level 0 and level 1). In some embodiments, the hierarchical tree data structure 700 is balanced. In other words, each node in a particular level of the hierarchical tree data structure 700 has the same number of child nodes and all of the leaf nodes are located at the highest level of granularity. In other embodiments, the hierarchical tree data structure 700 can be unbalanced. In other words, each node can either be a leaf node or have a number of child nodes. The determination of whether a particular node is connected to one or more child nodes can be determined based on a heuristic value for the mixture distribution encoded by the node. In one embodiment, a child node is created when a particular mixture component of the mixture distribution has a heuristic value that is above a threshold value. This can save storage requirements of the hierarchical tree data structure 700 by limiting the number of levels of granularity for particular branches of the tree. In such cases, the threshold is predefined when the hierarchical tree data structure 700 is generated from the point cloud 600.

In other embodiments, the threshold value can be set, at the time of traversal, to stop the traversal early and select a mixture distribution from a particular node of the hierarchical tree data structure 700 even though child nodes are further encoded at that particular branch. Dynamically changing the threshold for stopping early traversal enables a balanced hierarchical tree data structure 700 to be generated from the point cloud 600, and allows different algorithms to set the threshold value during traversal to change the operation of the algorithm to match the requirements of a particular application. For example, some applications may require less precision in the results than other applications and, therefore, one application may stop traversal earlier than another application using different adaptive threshold values.

In some embodiments, each node of the hierarchical tree data structure 700 encodes parameters for a particular mixture component of a mixture distribution associated with a parent node. For example, each of eight child nodes for the root node 710 can encode a weight and parameters for a distribution function that makes up one of the mixture components for a mixture distribution associated with the root node 710. In this case, each node encodes less information than in the embodiments described above and the hierarchical tree data structure 700 will typically have an additional level of granularity to encode the same amount of information. In this case, the root node represents a single mixture component for a single distribution function that represents the point objects 601 of the point cloud 600. Traversal of the hierarchical tree data structure 700 proceeds by reading the parameters from each of the child nodes of a particular node to calculate the correspondence values for each child node and then selecting a particular child node having the highest correspondence value.

Returning now to the E step of the registration algorithm, the E step implements a recursive search to traverse the hierarchical tree data structure 700. The purpose of the recursive search is to calculate the correspondences for only a subset of the mixture components encoded within the hierarchical tree data structure 700, selecting the path of traversal based on the correspondence values for each mixture component. Consequently, traversal of certain branches of the hierarchical tree data structure 700 can be completely eliminated, and correspondence values set to zero, when a correspondence value for a particular mixture component is significantly less than the correspondence value of a different mixture component for a mixture distribution encoded by a particular node of the hierarchical tree data structure 700.

In some embodiments, the recursive search can include an adaptive scale selection criterion that compares a heuristic value for each mixture component of the hierarchical tree data structure 700 to an adaptive threshold value and stops the traversal if the heuristic value is below the adaptive threshold value. The heuristic value for each mixture component can be calculated when the hierarchical tree data structure 700 is generated and reused over multiple recursive search iterations (i.e., each E step).

In some embodiments, the heuristic value for a particular mixture component is based on a complexity measurement calculated using the eigenvalues associated with the covariance matrix $\Sigma$ for the particular mixture component. In some embodiments, the heuristic value can be calculated as the following equation based on the eigenvalues for the covariance matrix, where $\lambda_1 \geq \lambda_2 \geq \lambda_3$:

$$h = \frac{\lambda_3}{\lambda_1 + \lambda_2 + \lambda_3} \quad \text{(Eq. 4)}$$

Traversing the hierarchical tree data structure 700 is a recursive process that proceeds one node at a time. The recursive process takes a point object as an input and processes a node based on the point object. The recursive process reads the parameters encoded in the current node, selects a child node that corresponds with the point object, if that child node exists, and then compares a heuristic value for the child node to an adaptive threshold value. If the heuristic value is above the adaptive threshold value, then the recursive process is repeated for the child node. However, if the current node is a leaf node (i.e., has no corresponding child node that corresponds with the point object) or if the heuristic value is below the adaptive threshold value, then the recursive process terminates and associates the point object with the current node. In various applications of the registration algorithm, a value of 0.01 for the adaptive threshold value has been found to speed up the registration algorithm and provide acceptable results compared to results obtained without using the adaptive selective scaling criterion.

It will be appreciated that, in some embodiments, the heuristic value calculation and the adaptive threshold value can be defined differently such that the traversal is terminated if the heuristic value is above the adaptive threshold value and the traversal continues if the heuristic value is below the adaptive threshold value. Furthermore, when the heuristic value is equal to the adaptive threshold value, the determination of whether to terminate or continue traversal can be implemented to either continue or terminate, and is merely a choice of design of the E step algorithm.

In some embodiments, associating the point $z_i$ with the current node comprises storing the parameters for the mixture distribution for the current node in a data structure that associates the parameters with the point $z_i$. Associating the point $z_i$ with the current node can also include calculating the correspondence values for each of the mixture components of the mixture distribution for the current node. In other embodiments, associating the point $z_i$ with the current node comprises storing the parameters for a particular mixture component of the mixture distribution that corresponds with the point $z_i$ in a data structure that associates the parameters with the point $z_i$. In yet other embodiments, associating the point $z_i$ with the current node comprises storing an index for the node in a data structure that associates the index with the point $z_i$, thereby allowing a processing unit to quickly access the parameters encoded by the node using the index.

The adaptive scaling selection criterion is useful to speed up the E step. For example, some geometry, such as a flat wall that spans many feet, is more uniform than other complex geometry, such as a set of blinds or a tree. In such cases, a lower level of granularity can be sufficient to describe the less complex geometry. The hierarchical tree data structure 700 can be generated to be balanced, and the adaptive scaling selection criterion can be set later such that the level of granularity that is sufficient for a particular application can be selected at traversal rather than when the tree is created.

Figure 8:
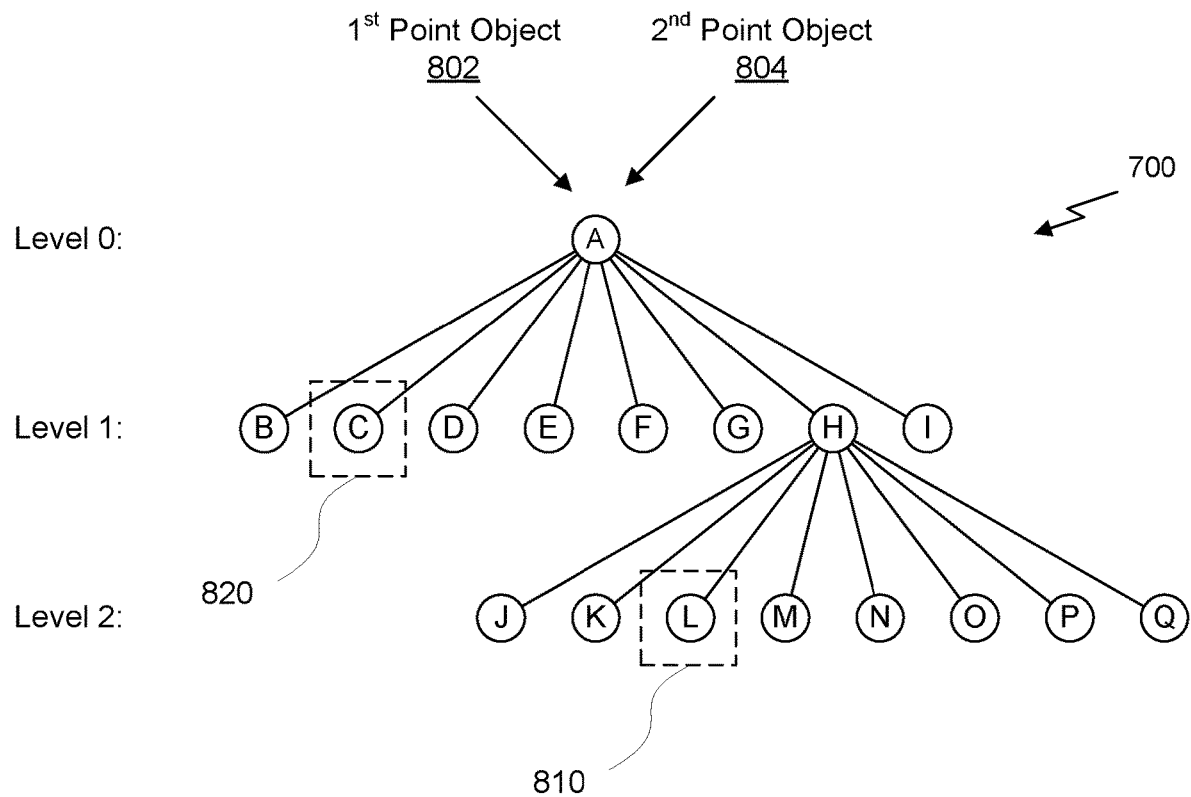
FIG. 8 illustrates a recursive traversal of the hierarchical tree data structure using an adaptive scale criterion, in accordance with some embodiments.

FIG. 8 illustrates a recursive traversal of the hierarchical tree data structure 700 using an adaptive scale criterion, in accordance with some embodiments. As shown in FIG. 8, a first traversal of the hierarchical tree data structure 700 for a first point object 802 can start at node 'A', the root node. Processing the root node for the first point object 802, the recursive process identifies node 'H' as the child node corresponding with the mixture component of the mixture distribution for node 'A' having the highest correspondence value for the first point object 802. The recursive process then compares a heuristic value corresponding to the mixture component associated with node 'H' to an adaptive threshold value. The heuristic value is greater than the adaptive threshold value, so the first traversal proceeds with a recursive call to process node 'H'. Processing node 'H' for the first point object 802, the recursive process identifies node 'L' as the child node corresponding with the mixture component of the mixture distribution for node 'H' having the highest correspondence value for the first point object 802. The recursive process then compares a heuristic value corresponding to the mixture component associated with node 'L' to the adaptive threshold value. Again, the heuristic value is greater than the adaptive threshold value, so the first traversal proceeds with a recursive call to process node 'L'. Processing node 'L' for the first point object 802, the recursive process identifies that node 'L' is a leaf node and associates the first point object 802 with node 'L'. In other words, traversal of the hierarchical tree data structure 700 for the first point object 802 stops at the second level of granularity at leaf node 810.

Alternatively, node 'L' could have child nodes (not explicitly shown in FIG. 8), and once the recursive process identified the mixture component of the mixture distribution for node 'L' having the highest correspondence value for the first point object 802, the recursive process compares a heuristic value for the mixture component to the adaptive threshold value and determines that the heuristic value is less than the adaptive threshold value. Therefore, the traversal terminates at the parent node 810.

Conversely, a second traversal of the hierarchical tree data structure 700 for a second point object 804 can start at node 'A', the root node. Processing the root node for the second point object 804, the recursive process identifies node 'C' as the child node corresponding with the mixture component of the mixture distribution for node 'A' having the highest probability for generating the second point object 804. The recursive process then compares a heuristic value corresponding to the mixture component associated with node 'C' to an adaptive threshold value. The heuristic value is greater than the adaptive threshold value, so the second traversal proceeds with a recursive call to process node 'C'. Processing node 'C' for the second point object 804, the recursive process identifies a child node (not explicitly shown in FIG. 8) corresponding with the mixture component of the mixture distribution for node 'C' having the highest probability for generating the second point object 804. The recursive process then compares a heuristic value corresponding to the mixture component associated with that child node to an adaptive threshold value. The heuristic value is less than the adaptive threshold value, so the second traversal terminates at the parent node 820, and the second point object 804 is associated with node 'C'.

It will be appreciated that the first traversal of the hierarchical tree data structure 700 for the first point object 802 stopped at the second level of granularity at node 'L' whereas the second traversal of the hierarchical tree data structure 700 for the second point object 804 stopped at the first level of granularity at node 'C' rather than stopping at the same level of granularity as the first traversal. In other words, the E step can adapt the association of point objects in the point cloud being registered to different mixture distributions at different levels of granularity of the hierarchical tree data structure 700. Fundamentally, this allows for loose associations of some points to clusters of points in the reference point cloud represented by larger mixture distributions and tight associations of other points to clusters of points in the reference point cloud represented by smaller mixture distributions. The terms "larger" and "smaller" in this context typically refer to the variance(s) associated with the mixture components in the mixture distributions.

The E step runs for a set of point objects 601 in the point cloud 600 being registered to the reference point cloud represented by the hierarchical tree data structure 700 of mixture distributions. In some embodiments, the output of the E step is a data structure (e.g., file, table, etc.) that associates each point object 601 with a corresponding node of the hierarchical tree data structure 700. In some embodiments, the set of point objects 601 includes all such point objects 601 in the point cloud 600. In other embodiments, the set of point objects 601 includes only a sub-set of point objects 601 in the point cloud 600. In other words, the sub-set of point objects 601 can represent a statistical sample of the point objects 601 in the point cloud 600. Where a point cloud 600 includes hundreds of millions or billions of point objects 601, for example, registration can be performed using a few percent of the point objects 601 in the point cloud 600 rather than the full set of point objects 600.

In some embodiments, the adaptive threshold value can be changed dynamically during each iterative cycle of the E Step and M step. For example, during a first iteration, the adaptive threshold value can be a first value that stops traversal of the hierarchical tree data structure at a lower level of granularity than during a second iteration, where the adaptive threshold value can be a second value, lower than the first value, that stops traversal of the hierarchical tree data structure 700 at a higher level of granularity. Consequently, early iterative cycles of the EM algorithm can coarsely register the data followed by a fine registration during later iterative cycles where the point cloud is already roughly registered to the reference point cloud.

In addition, in some embodiments, the adaptive threshold can be set to zero such that traversal will always continue until reaching a leaf node at the highest level of granularity. Thus, the adaptive scaling selection criterion can be turned off by a user running the registration algorithm simply by setting the adaptive threshold value to zero.

Once the E step is complete and the associations between the point objects 601 and the nodes of the hierarchical tree data structure 700 are determined for the current iterative cycle, the registration algorithm executes the M step to determine an estimated transformation for the point cloud 600. Given N points $z_i$ and J mixture components $\Theta_j$ used to represent the reference point cloud, a set of point-to-mixture component correspondences $C=\{c_{ij}\}$ are introduced such that the full joint probability becomes:

$$\ln p(T(Z), C|\Theta) = \Sigma_{i=1}^{N} \Sigma_{j=1}^{J} c_{ij}\{\ln \pi_j + \ln N(T(z_i)|\Theta_j)\} \qquad \text{(Eq. 5)}$$

During the E Step, the set of point-to-mixture component correspondences are calculated based on the traversal of the hierarchical tree data structure 700. Then, during the M step, the expected data log likelihood with respect to the transformation T is maximized while keeping the set of point-to-mixture component correspondences fixed:

$$\hat{T} = \text{argmax } E_{p(C|T(Z),\Theta)}[\ln p(T(Z)|C|\Theta)] \qquad \text{(Eq. 6)}$$

$$= \text{argmax} \sum_{ij} \gamma_{ij}\{\ln \pi_j + \ln N(T(z_i), C|\Theta)\} \qquad \text{(Eq. 7)}$$

$$= \text{argmin} \sum_{ik} \gamma_{ij}(T(z_i) - \mu_j)^T \sum_{j}^{-1} (T(z_i) - \mu_j) \qquad \text{(Eq. 8)}$$

More specifically, as shown in Equation 8, the most likely transformation T between the point cloud and the reference point cloud is the transformation that minimizes the weighted sum of squared Mahalanobis distances between points of the point cloud and individual mixture components of the probabilistic model of the reference point cloud. The summation in Equation 8 can be referred to herein as the maximum likelihood estimation (MLE) criteria.

In one embodiment, the maximum likelihood estimation (MLE) criteria of Equation 8 is based on the Mahalanobis distance or, more particularly, the generalized squared value of the distance between a point, transformed by the transformation T, and a mean of a mixture component, normalized by the covariance matrix. In Equation 8, the weights $\gamma_{ij}$ are related to the associations between each point, $z_i$, and the corresponding mixture component associated with the point. In one embodiment, for a particular point $z_i$, there is exactly one weight $\gamma_{ij}$ associated with a single mixture component $\Theta_j$ that is set to one and all other weights for that point are set to zero. The particular mixture component having a weight of one is the mixture component having the highest correspondence value for the point $z_i$ in the mixture distribution associated with that point during the E step, described above.

In other embodiments, each point can be associated with multiple non-zero weights. For example, all weights for correspondence values below a threshold value can be set to zero, and one or more weights for correspondence values above the threshold value can be normalized such that the non-zero weights for a point sum to one. This allows for a soft traversal of the hierarchical tree data structure 700 when the choice between two or more mixture components based on correspondence values is not clear. For example, when two correspondence values indicate that the point is almost as likely to be generated from one mixture component as another mixture component, then the MLE criteria can be calculated based on the Mahalanobis distance of the point to both mixture components.

Equation 8 has no closed form solution and, therefore, is difficult to solve without limiting the covariances (e.g., limiting the mixture components to have only isotropic covariances) or using approximations for the maximum likelihood estimation (MLE) criterion that remove or degrade information. Restricting the transformation, T, to the set of all rigid transformations, the double sum over points Z and mixture components $\Theta_j$ can be reduced to a single sum over mixture component $\Theta_j$:

$$\hat{T} = \arg\min \sum_j \pi_j^*(T(\mu_j^*) - \mu_j)^T \sum_j^{-1}(T(\mu_j^*) - \mu_j), \quad \text{(Eq. 9)}$$

where:

$$\pi_j^* = \frac{\sum_i \gamma_{ij}}{N} \quad \text{(Eq. 10)}$$

$$\mu_j^* = \frac{\sum_i \gamma_{ij} z_i}{\sum_i \gamma_{ij}} \quad \text{(Eq. 11)}$$

Equation 9 has no closed form solution. However, reinterpreting the Mahalanobis distance calculation can lead to a highly accurate technique for determining the estimated transformation T that minimizes the MLE criteria. More specifically, the inner Mahalanobis distance term can be rewritten by decomposing each covariance matrix into its associated eigenvalues and eigenvectors using Principal Component Analysis (PCA), and interpreting each Mahalanobis distance term as a weighted sum of three separate point-to-plane distances, where the weights are inversely proportional to the eigenvalues associated with each plane defined by a corresponding eigenvector. The following equivalence can be written based on this interpretation:

$$\|T(\mu_j^*) - \mu_j\|_{\Sigma_j}^2 = \sum_{l=1}^{3} \frac{1}{\lambda_l}(n_l^T(T(\mu_j^*) - \mu_j))^2 \quad \text{(Eq. 12)}$$

Substituting Equation 12 into Equation 9 yields the following equation, which can be solved using any number of minimization techniques including, in at least some embodiments, a linear least squares technique using small angle assumptions:

$$\hat{T} = \arg\min_T \sum_{j=1}^{J} \sum_{l=1}^{3} \frac{\pi_j^*}{\lambda_{jl}}(n_{jl}^T(T(\mu_j^*) - \mu_j))^2, \quad \text{(Eq. 13)}$$

where $n_{jl}$, $l=1 \ldots 3$ represent the three eigenvectors for the $j^{th}$ mixture component covariance matrix, and $\lambda_{jl}$ are the corresponding eigenvalues.

Figure 9:
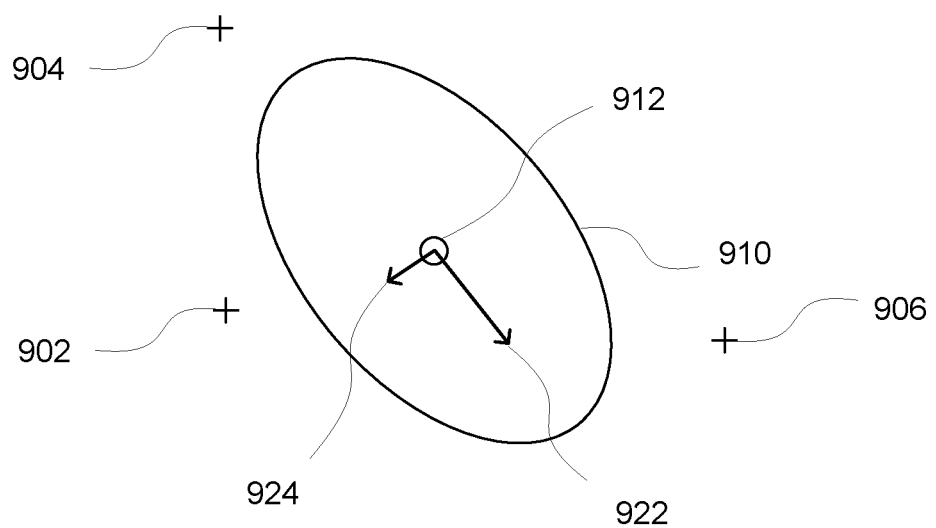
FIG. 9 illustrates the maximization step calculations for a single mixture component, in accordance with some embodiments.

FIG. 9 illustrates the M step calculations for a single mixture component, in accordance with some embodiments. For each mixture component in the hierarchical tree data structure 700, calculate a first parameter $\pi_j^*$ for the mixture component 910 in accordance with Equation 10 and a second parameter $\mu_j^*$ for the mixture component 910 in accordance with Equation 11. The first parameter is the average weight associated with the mixture component for the N points in the point cloud being registered. The second parameter is a mean location for the N points in the point cloud, with respect to the weights such that the mean location is skewed toward the mixture component based on the probability associated with each point. As shown in FIG. 9, three point objects 902, 904, and 906 can contribute to the calculation of the first and second parameters. The first and second parameters are based on the correspondence values (e.g., $\gamma_{ij}$) determined during the E step.

The inner sum from Equation 13 can then be calculated for the mixture component based on the eigenvectors 922, 924 (illustrated in only two dimensions) and the mean $\mu_j$ of the mixture component 912. In other words, the M step first locates a position relative to the mean of the mixture component 912, based on the correspondence values for the N points in the point cloud and the location of those points, and then the M step calculates a squared Mahalanobis distance for that position along the three principal axes of the covariance based on varying the transformation T.

Figure 10:
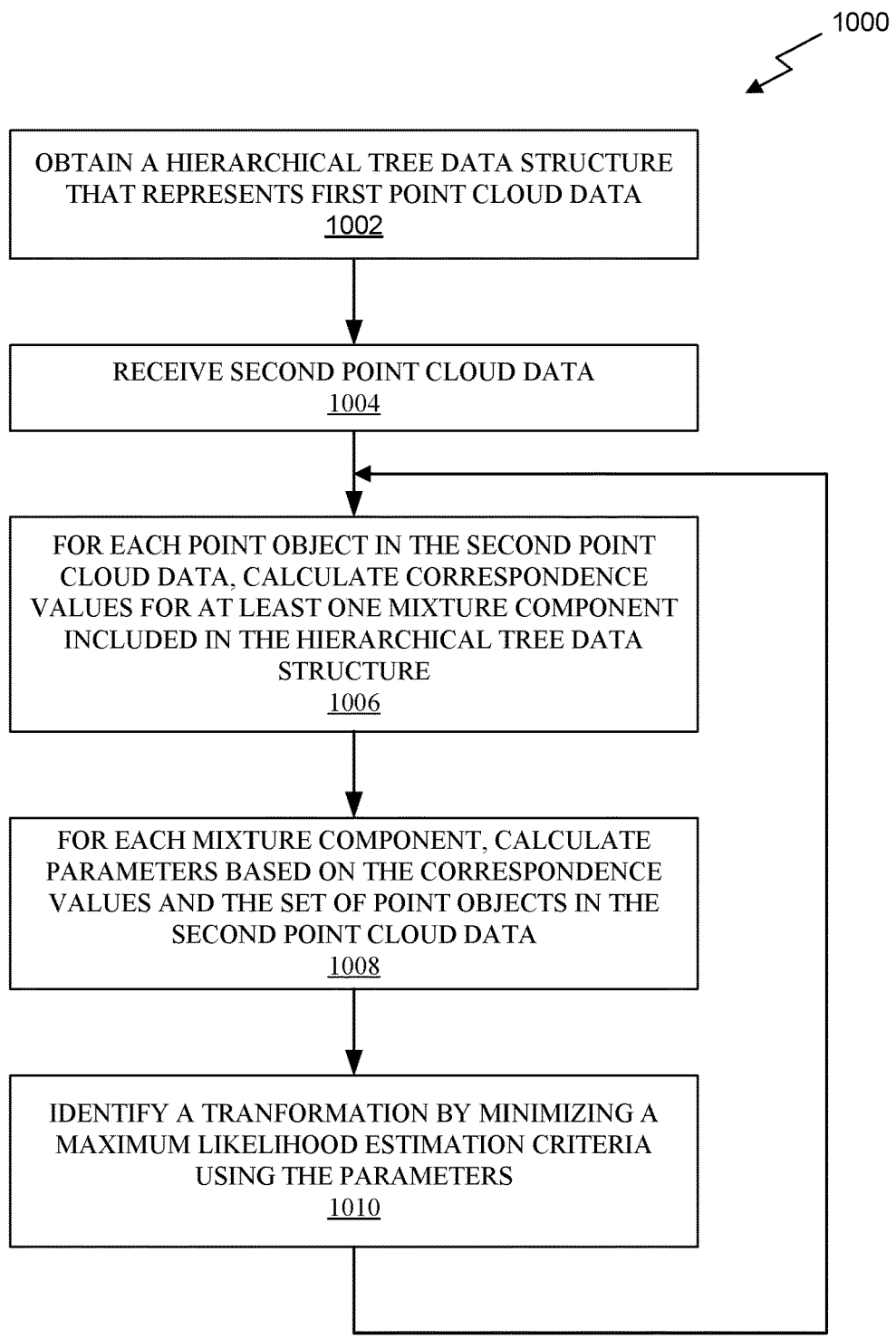
FIG. 10 illustrates a flowchart of a method for registering point cloud data using an EM algorithm, in accordance with some embodiments.

FIG. 10 illustrates a flowchart of a method 1000 for registering point cloud data using an EM algorithm, in accordance with some embodiments. Although method 1000 is described in the context of a processing unit, the method 1000 may also be performed by a program, custom circuitry, or by a combination of custom circuitry and a program. For example, the method 1000 may be executed by a GPU (graphics processing unit), CPU (central processing unit), or any processor capable of implementing at least a portion of the EM algorithm. Furthermore, persons of ordinary skill in the art will understand that any system that performs method 1000 is within the scope and spirit of embodiments of the present disclosure At step 1002, a hierarchical tree data structure is obtained that represents first point cloud data. The first point cloud data is a reference point cloud. At step 1004, second point cloud data is received. The second point cloud data is a point cloud that is going to be registered to the reference point cloud.

At step 1006, a processing unit is configured to, for each point object in the second point cloud data, calculate correspondence values for at least one mixture component included in the hierarchical tree data structure. Step 1006 is performed as part of the E step in the EM algorithm. The correspondence values can be calculated as part of a traversal procedure where correspondence values for all of the mixture components are initially set to zero. As the traversal procedure is executed for each point object in the second point cloud data, at least a portion of the correspondence values are replaced with non-zero values. For example, the processing unit, during the processing of a particular node in the hierarchical tee data structure, can calculate correspondence values for each of the mixture components associated with the particular node in accordance with Equation 3. In some embodiments, the correspondence values can be normalized, such as by applying a soft max function to the correspondence values. The soft max function will skew high correspondence values to have higher weights and low correspondence values to have lower weights. In some embodiments, there is exactly one non-zero correspondence value for a corresponding one mixture component in each particular node, the non-zero correspondence value associated with the mixture component having the maximum correspondence value as calculated in accordance with Equation 3. It will be appreciated that the formula for calculating the correspondence values can vary and different formulas can be used to determine a strength of an association between a point, or transformed point, and a mixture component.

At step 1008, a processing unit is configured to, for each mixture component included in the hierarchical tree data structure, calculate parameters based on the correspondence values and the set of point objects in the second point cloud data. In some embodiments, the processing unit calculates a first parameter $\pi_j^*$ for each mixture component in accordance with Equation 10 and a second parameter $\mu_j^*$ for each mixture component in accordance with Equation 11.

At step 1010, a processing unit is configured to identify a transformation by minimizing a MLE criteria using the parameters. In some embodiments, the MLE criteria is given by the calculation of Equation 13, which is a sum over the J mixture components included in the hierarchical tree data structure. In some embodiments, the minimization can be performed using a weighted least squares technique, based on small angle assumptions. In other embodiments, other minimization techniques for identifying the transformation can be substituted for the weighted least squares technique.

Step 1008 and 1010 comprise the M step of the EM algorithm. Steps 1006, 1008, and 1010, executed in sequence, comprise an iterative cycle of the EM algorithm. Subsequent to completing each iterative cycle of the EM algorithm, steps 1006, 1008, and 1010 can be repeated, using the transformation identified in the previous step 1010 to transform the point objects included in the second point cloud data prior to calculating the new correspondence values in step 1006.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A computer-implemented method for registration of point cloud data, comprising:
    obtaining a hierarchical tree data structure that represents first point cloud data as a hierarchy of mixture distributions;
    receiving second point cloud data; and
    registering the second point cloud data to the first point cloud data utilizing the hierarchical tree data structure to identify an estimated transformation,
    wherein the registering comprises executing, on a parallel processing unit, an expectation maximization algorithm that includes:
        an expectation (E) step configured to implement a recursive search of the hierarchical tree data structure to associate each point in the second point cloud data with a node of the hierarchical tree data structure, and
        a maximization (M) step configured to determine the estimated transformation based on the association of the points in the second point cloud data with corresponding nodes of the hierarchical tree data structure.

2. The computer-implemented method of claim 1, further comprising iteratively alternating between the E step and the M step for a number of cycles to converge on an optimal transformation.

3. The computer-implemented method of claim 1, wherein the E step includes, at each node during the recursive search of the hierarchical tree data structure:
    comparing a heuristic value for each mixture component included in the mixture distribution for the node to an adaptive threshold value to determine whether to terminate the recursive search for a particular child node of the node associated with the mixture component.

4. The computer-implemented method of claim 3, wherein the heuristic value is based on eigenvalues associated with a covariance matrix identified for a particular mixture component included in the mixture distribution of the node.

5. The computer-implemented method of claim 1, wherein the M step includes solving for a maximum likelihood estimation (MLE) criteria using a weighted least squares technique.

6. The computer-implemented method of claim 1, further comprising:
    receiving the first point cloud data; and
    generating the hierarchical tree data structure.

7. The computer-implemented method of claim 6, wherein generating the hierarchical tree data structure comprises iterating through a second EM algorithm to generate the hierarchical tree data structure.

8. The computer-implemented method of claim 6, wherein each node of the hierarchical tree data structure represents at least a portion of the first point cloud data using a mixture distribution that includes a number of Gaussian distributions and a uniform distribution.

9. The computer-implemented method of claim 1, wherein the E step comprises, for each point object in the second point cloud data:
    for each mixture component associated with the node associated with the point object, calculating a correspondence value for the mixture component in accordance with the following equation:

$$E[c_{ij}] = \frac{\pi_j N(Z_i|\Theta_j)}{\sum_{k=1}^{J} \pi_k N(Z_i|\Theta_k)}.$$

10. The computer-implemented method of claim 1, wherein the M step comprises, for each mixture component included in the hierarchical tree data structure:

calculating a first parameter for the mixture component in accordance with the following equation:

$$\pi_j^* = \frac{\sum_i \gamma_{ij}}{N};$$

calculating a second parameter for the mixture component in accordance with the following equation:

$$\mu_j^* = \frac{\sum_i \gamma_{ij} z_i}{\sum_i \gamma_{ij}}.$$

11. The computer-implemented method of claim 10, wherein the M step further comprises:

identifying a transformation by minimizing a maximum likelihood estimation (MLE) criteria using a weighted least squares technique, wherein the MLE criteria comprises a sum over J mixture components included in the hierarchical tree data structure in accordance with the following equation:

$$\hat{T} = \underset{T}{\arg\min} = \sum_{j=1}^{J} \sum_{l=1}^{3} \frac{\pi_j^*}{\lambda_{jl}} (n_{jl}^T (T(\mu_j^*) - \mu_j))^2.$$

12. A system for performing registration of point cloud data, the system comprising:

a memory configured to store:
 a hierarchical tree data structure that represents first point cloud data as a hierarchy of mixture distributions, and
 a data structure that includes second point cloud data; and
at least one processing unit configured to execute an expectation maximization (EM) algorithm to register the second point cloud data to the first point cloud data utilizing the hierarchical tree data structure,
wherein the EM algorithm includes:
 an expectation (E) step configured to implement a recursive search of the hierarchical tree data structure to associate each point in the second point cloud data with a node of the hierarchical tree data structure, and
 a maximization (M) step configured to determine the estimated transformation based on the association of the points in the second point cloud data with corresponding nodes of the hierarchical tree data structure.

13. The system of claim 12, wherein the E step includes, at each node during the recursive search of the hierarchical tree data structure:

comparing a heuristic value for each mixture component included in the mixture distribution for the node to an adaptive threshold value to determine whether to terminate the recursive search for a particular child node of the node associated with the mixture component.

14. The system of claim 12, wherein the M step includes solving for a maximum likelihood estimation (MLE) criteria using a weighted least squares technique.

15. The system of claim 12, wherein each node of the hierarchical tree data structure represents at least a portion of the first point cloud data using a mixture distribution that includes a number of Gaussian distributions.

16. The system of claim 12, further comprising one or more active sensors configured to capture the second point cloud data.

17. The system of claim 12, wherein the at least one processing unit includes:

a first parallel processing unit configured to implement the E step of the EM algorithm; and
a second parallel processing unit connected to the first parallel processing unit through a high-speed interconnect and configured to implement the M step of the EM algorithm.

18. A non-transitory computer-readable media storing computer instructions that, when executed by one or more processors, cause the one or more processors to perform the steps of:

obtaining a hierarchical tree data structure that represents first point cloud data as a hierarchy of mixture distributions;
receiving second point cloud data; and
registering the second point cloud data to the first point cloud data utilizing the hierarchical tree data structure to identify an estimated transformation,
wherein the registering comprises executing, on a parallel processing unit, an expectation maximization algorithm that includes:
 an expectation (E) step configured to implement a recursive search of the hierarchical tree data structure to associate each point in the second point cloud data with a node of the hierarchical tree data structure, and
 a maximization (M) step configured to determine the estimated transformation based on the association of the points in the second point cloud data with corresponding nodes of the hierarchical tree data structure.

19. The non-transitory computer-readable media of claim 18, wherein the E step comprises, for each point object in the second point cloud data:

for each mixture component associated with the node associated with the point object, calculating a correspondence value for the mixture component in accordance with the following equation:

$$E[c_{ij}] = \frac{\pi_j N(Z_i|\Theta_j)}{\sum_{k=1}^{J} \pi_k N(Z_i|\Theta_k)}.$$

20. The non-transitory computer-readable media of claim 18, wherein the M step comprises, for each mixture component included in the hierarchical tree data structure:

calculating a first parameter for the mixture component in accordance with the following equation:

$$\pi_j^* = \frac{\sum_i \gamma_{ij}}{N};$$

calculating a second parameter for the mixture component in accordance with the following equation:

$$\mu_j^* = \frac{\sum_i \gamma_{ij} z_i}{\sum_i \gamma_{ij}}.$$

21. A computer-implemented method for utilization of a hierarchical tree data structure that represents first point cloud data as a hierarchy of mixture distributions, the method comprising:
    identifying an estimated transformation by registering second point cloud data to the first point cloud data utilizing the hierarchical tree data structure;
    wherein the registering comprises executing an expectation maximization algorithm that includes,
        an expectation (E) step configured to implement a recursive search of the hierarchical tree data structure to associate each of a plurality of points in the second point cloud data with a corresponding node of the hierarchical tree data structure, and
        a maximization (M) step configured to determine the estimated transformation based on the association of the points in the second point cloud data with corresponding nodes of the hierarchical tree data structure; and
    iteratively alternating between the E step and the M step for a number of cycles to converge toward an optimal estimated transformation.

22. The computer-implemented method of claim 21, wherein the expectation maximization algorithm is executed on a parallel processing unit.

* * * * *